US010301408B2

(12) United States Patent
Pampaloni et al.

(10) Patent No.: US 10,301,408 B2
(45) Date of Patent: May 28, 2019

(54) OXO-NITROGENATED VANADIUM COMPLEX, CATALYTIC SYSTEM COMPRISING SAID OXO-NITROGENATED VANADIUM COMPLEX AND PROCESS FOR (CO)POLYMERISING CONJUGATED DIENES

(71) Applicant: VERSALIS S.p.A., San Donato Milanese (IT)

(72) Inventors: Guido Pampaloni, Pontedera (IT); Giovanni Ricci, Parma (IT); Anna Sommazzi, Santa Margherita Ligure (IT); Francesco Masi, Sant'Angelo Lodigiano (IT); Giuseppe Leone, Milan (IT)

(73) Assignee: Versalis S.p.A., San Donato Milanese (IT)

( * ) Notice: Subject to any disclaimer, the term of this patent is extended or adjusted under 35 U.S.C. 154(b) by 83 days.

(21) Appl. No.: 15/538,338

(22) PCT Filed: Dec. 23, 2015

(86) PCT No.: PCT/EP2015/081106
§ 371 (c)(1),
(2) Date: Jun. 21, 2017

(87) PCT Pub. No.: WO2016/102639
PCT Pub. Date: Jun. 30, 2016

(65) Prior Publication Data
US 2017/0349682 A1 Dec. 7, 2017

(30) Foreign Application Priority Data
Dec. 23, 2014 (IT) .............................. MI2014A2219

(51) Int. Cl.
C08F 4/68 (2006.01)
C08F 136/06 (2006.01)
C08F 136/08 (2006.01)

(52) U.S. Cl.
CPC .......... C08F 136/06 (2013.01); C08F 4/6812 (2013.01); C08F 4/68043 (2013.01); C08F 136/08 (2013.01)

(58) Field of Classification Search
CPC ................................ C08F 4/6812; C08F 4/68
See application file for complete search history.

(56) References Cited

U.S. PATENT DOCUMENTS

| 3,076,830 A * | 2/1963 | Conn | ...................... | C07F 9/005 |
| | | | | 556/44 |
| 3,595,842 A * | 7/1971 | Schrage | ................ | C08F 210/00 |
| | | | | 526/128 |
| 9,145,492 B1 * | 9/2015 | Al-Harthi | ................. | C08K 9/02 |
| 9,493,404 B2 * | 11/2016 | Sommazzi | ............. | C07F 15/065 |
| 2004/0077890 A1 * | 4/2004 | Kristen | ................... | C07F 9/005 |
| | | | | 556/32 |

FOREIGN PATENT DOCUMENTS

| JP | H11-199593 A | | 7/1999 | |
| JP | 2001-64316 A | * | 3/2001 | ............... C08F 4/68 |
| JP | 2001064316 A | | 3/2001 | |
| WO | WO2011/061151 A1 | | 5/2011 | |

OTHER PUBLICATIONS

International Search Report and Written Opinion for PCT/EP2015/081106, dated Feb. 11, 2016, 12 pages.
Kasumov, "Spectroscopic Studies of Metal Complexes With Redox-active Hydrogenated Schiff Bases", Spectrochimica Acta Part A: Molecular and Biomolecular Spectroscopy, Mar. 1, 2001; pp. 451-460.
Porri L. et al., "Comprehensive Polymer Science" (1989), Eastmond G. C. et al. eds., Pergamon Press, Oxford, UK, vol. 4, part II, pp. 53-108.
Natta G. et al., "La Chimica e L'Industria" (1958), vol. 40, p. 362.
Natta G et al., "Chemical Abstracts" (1959), vol. 53, p. 195.
Natta G. et al., "La Chimica e L'Industria" (1959), vol. 41, p. 116.
Natta G. et al., "Chemical Abstracts" (1959), vol. 53, p. 15619.
Natta G. et al., "Atli Accademia Nazionale dei Lincei—Classe di Scienze fisiche, matematiche e naturali" (1961), vol. 31(5), p. 189.
Natta G. et al., "Chemical Abstracts" (1962), vol. 57, p. 4848.
Porri L. et al., "Die Makromolekulare Chemie" (1963), vol. 61(1), pp. 90-103.
Ricci G. et al., "Polymer Communication" (1991), vol. 32, pp. 514-517.
Ricci G. et al., "Journal of Polymer Science Part A: Polymer Chemistry" (2007), vol. 45(20), pp. 4635-4646.
Natta G. et al., "La Chimica e L'Industria" (1959), vol. 41, p. 526.
Ricci G. et al., "Polymer" (1996), vol. 37(2), pp. 363-365.
Porri L. et al., "Metalorganic Catalyst for Synthesis and Polymerization" (1999), Kaminsky W. ed., Springer-Verlag Berlin Heidelberg, pp. 519-530.
Martin D. F. et al., in "Journal of the American Chemical Society" (1961), vol. 83, pp. 73-75.

(Continued)

Primary Examiner — Rip A Lee
(74) Attorney, Agent, or Firm — Abel Schillinger, LLP

(57) ABSTRACT

An oxo-nitrogenated vanadium complex having the general formula (I): in which: —$R_1$, $R_2$, $R_3$, $R_4$, $R_5$, $R_6$ and $R_7$, mutually identical or different, represent a hydrogen atom; or are selected from optionally halogenated, linear or branched $C_1$-$C_{20}$, preferably $C_1$-$C_{15}$, alkyl groups, optionally substituted cycloalkyl groups, optionally substituted aryl groups; —$X_1$ and $X_2$, mutually identical or different, represent a halogen atom such as, for example, chlorine, bromine, iodine, preferably chlorine; or are selected from linear or branched $C_1$-$C_{20}$, preferably $C_1$-$C_{15}$, alkyl groups, —$OCOR_8$ groups or —$OR_8$ groups in which $R_8$ is selected from linear or branched $C_1$-$C_{20}$, preferably $C_1$-$C_{15}$, alkyl groups; —Y is selected from ethers such as, for example, diethyl ether, tetrahydrofuran (THF), dimethoxyethane, preferably is tetrahydrofuran (THF); —n is 0 or 1. Said oxo-nitrogenated vanadium complex having the general formula (I) may advantageously be used in a catalytic system for (co)polymerizing conjugated dienes.

6 Claims, 33 Drawing Sheets

(56) References Cited

OTHER PUBLICATIONS

Collman et al., in "Inorganic Syntheses" (1966), vol. 8, pp. 149-153.
Chen H.-Y. et al., in "Journal of Molecular Catalysis A: Chemical" (2011), vol. 339, pp. 61-71.
Nomura K. et al., in "Inorganic Chemistry" (2013), vol. 52, pp. 2607-2614.
Natta G. et al., "Chemical Abstracts" (1960), vol. 54, p. 1258.
Igarashi A. et al., in "Catalyst" (2013), vol. 3, pp. 148-156.
Igarashi A. et al., in "Organometallics" (2012), vol. 31(9), pp. 3575-3581.
Zhang S. et al., in "Journal of the American Chemical Society" (2010), vol. 132(13), pp. 4960-4965.
Zhang S. et al., in "Organometallics" (2009), vol. 28, pp. 5925-5933.
Röhrscheid F. et al., in "Inorganic Chemistry" (1967), vol. 6, No. 9, pp. 1607-1613.
Lee J.-I. et al., in "Journal of Molecular Structure" (2009), vol. 929, pp. 207-212.
Patil S. A. in "Synthetic Communications" (2013), vol. 43, issue 7, pp. 2349-2364.
Zhang Z.-H. in "Advanced Synthesis & Catalysis" (2006), issue 1-2, pp. 184-190.
Ricci G. et al., "Advances in Organometallic Chemistry Research" (2007), Yamamoto K. ed., Nova Science Publisher Inc., USA, pp. 1-36.
Ricci G. et al., "Coordination Chemistry Reviews" (2010), vol. 254, pp. 661-676.
Ricci G. et al., "Ferrocenes: Compounds, Properties and Applications" (2011), Elisabeth S. Phillips ed., Nova Science Publisher, Inc., USA, pp. 273-313.
Ricci G. et al., "Chromium: Environmental, Medical and Material Studies" (2011), Margaret P. Salden ed., Nova Science Publisher, Inc., USA, pp. 121-140.
Ricci G. et al., "Cobalt: Characteristics, Compounds, and Applications" (2011), Lucas J. Vidmar ed., Nova Science Publisher, Inc., USA, pp. 39-81.
Ricci G. et al., "Phosphorus: Properties, Health effects and Environment" (2012), Ming Yue Chen and Da-Xia Yang eds., Nova Science Publisher, Inc., USA, pp. 53-94.
Manzer L. E. et al., "Inorganic Syntheses" (1982), vol. 21, pp. 135-140.
Mochel, V. D., in "Journal of Polymer Science Part A-1: Polymer Chemistry" (1972), vol. 10, issue 4, pp. 1009-1018.
Sato H. et al., in "Journal of Polymer Science: Polymer Chemistry Edition" (1979), vol. 17, issue 11, pp. 3551-3558.

* cited by examiner

FT-IR spectrum (solid state, UATR) of ligand (L1) (Example 1)

¹H-NMR spectrum of ligand (L1) (Example 1)

GC-MS chromatogram of ligand (L1) (Example 1)

FT-IR spectrum (solid state, UATR) of ligand (L2) (Example 2)

¹H-NMR (CD₂Cl₂) spectrum of ligand (L2) (Example 2)

GC-MS chromatogram of ligand (L2) (Example 2)

FT-IR spectrum (solid state, UATR) of ligand (L3) (Example 3)

$^1$H-NMR (CD$_2$Cl$_2$) spectrum of ligand (L3) (Example 3)

GC-MS chromatogram of ligand (L3) (Example 3)

FT-IR spectrum (solid state, UATR) of $VCl_2(L1)(thf)$ (GT-298) (Example 4)

FT-IR spectrum (solid state, UATR) of VCl$_2$(L2) (GT-301) (Example 5)

FT-IR spectrum (solid state, UATR) of $VCl_2(L3)$ (GT-363) (Example 6)

FT-IR spectrum of polybutadiene shown in Table 1: MM430 (Example 7)

FT-IR spectrum of polybutadiene shown in Table 1: G1304 (Example 8)

FT-IR spectrum of polybutadiene shown in Table 1: MM433 (Example 9)

FT-IR spectrum of polybutadiene shown in Table 1: MM316 (Example 10)

¹H-NMR (below) and ¹³C-NMR (above) spectra of polybutadiene shown in Table 1: G1305 (Example 11)

FT-IR spectrum of polybutadiene shown in Table 1: MM418 (Example 12)

FT-IR spectrum of polybutadiene shown in Table 1: MM417 (Example 13)

FT-IR spectrum of polybutadiene shown in Table 1: MM434 (Example 14)

FT-IR spectrum of polyisoprene shown in Table 2: G1316 (Example 15)

DSC diagram of polyisoprene shown in Table 2: G1316 (Example 15)

$^1$H-NMR (below) and $^{13}$C-NMR (above) spectra of polyisoprene shown in Table 2: G1316 (Example 15)

FT-IR spectrum of polyisoprene shown in Table 2: MM333 (Example 16)

DSC diagram of polyisoprene shown in Table 2: MM333 (Example 16)

$^1$H-NMR (below) and $^{13}$C-NMR (above) spectra of polyisoprene shown in Table 2: MM333 (Example 16)

DSC diagram of polyisoprene shown in Table 2: G1315 (Example 17)

¹H-NMR (below) and ¹³C-NMR (above) spectra of polyisoprene shown in Table 2: G1315 (Example 17)

DSC diagram of polyisoprene shown in Table 2: G1318 (Example 18)

$^1$H-NMR (below) and $^{13}$C-NMR (above) spectra of polyisoprene shown in Table 2: G1318 (Example 18)

FT-IR spectrum of polyisoprene shown in Table 2: MM427 (Example 19)

FT-IR spectrum of polyisoprene shown in Table 2: MM428 (Example 20)

FT-IR spectrum of polyisoprene shown in Table 2: MM429 (Example 21)

OXO-NITROGENATED VANADIUM COMPLEX, CATALYTIC SYSTEM COMPRISING SAID OXO-NITROGENATED VANADIUM COMPLEX AND PROCESS FOR (CO)POLYMERISING CONJUGATED DIENES

The present invention relates to an oxo-nitrogenated vanadium complex.

More particularly, the present invention relates to an oxo-nitrogenated vanadium complex and to the use thereof in a catalytic system for (co)polymerising conjugated dienes.

The present invention further relates to a catalytic system for (co)polymerising conjugated dienes comprising said oxo-nitrogenated vanadium complex.

Furthermore, the present invention relates to a process for (co)polymerising conjugated dienes, in particular to a process for polymerising 1,3-butadiene or isoprene, characterised in that it uses said catalytic system.

Stereospecific (co)polymerisation of conjugated dienes is known to be a very important process in the chemicals industry for obtaining products which are among the most widely used rubbers.

Said stereospecific (co)polymerisation may yield polymers having various structures, namely a 1,4-trans structure, a 1,4-cis structure, a 1,2 structure and, in the case of asymmetric conjugated dienes (e.g., isoprene), a 3,4 structure.

Catalytic systems based on vanadium have been known for some time in the field of (co)polymerising conjugated dienes for their ability to yield diene (co)polymers with a 1,4-trans structure, and are by far the most important systems for producing 1,4-trans polybutadiene as described, for example, in: Porri L. et al., "*Comprehensive Polymer Science*" (1989), Eastmond G. C. et al. eds., Pergamon Press, Oxford, UK, vol. 4, part II, pp. 53-108.

Heterogeneous catalytic systems obtained by combining vanadium halides [e.g., vanadium(III) chloride ($VCl_3$), vanadium(IV) chloride ($VCl_4$)] with alkylaluminiums [e.g., triethylaluminium ($AlEt_3$), diethylaluminium chloride ($AlEt_2Cl$)], yield a 1,4-trans polybutadiene (1,4-trans unit content of 97%-100%) which is crystalline, has a high molecular weight and a melting point ($T_m$) of about 145° C. Further details relating to said catalytic systems may be found, for example, in: Natta G. et al., "*La Chimica e L'Industria*" (1958), vol. 40, p. 362 and "*Chemical Abstracts*" (1959), vol. 53, p. 195; Natta G. et al., "*La Chimica e L'Industria*" (1959), vol. 41, p. 116 and "*Chemical Abstracts*" (1959), vol. 53, p. 15619.

Polybutadiene with a high 1,4-trans unit content, but with a lower molecular weight, may be prepared using homogeneous catalytic systems such as, for example, vanadium(III) chloride(tris-tetrahydrofuran)/diethylaluminium chloride ($VCl_3(TH\ F)_3/AlEt_2Cl$), vanadium(III)(tris-acetylacetonate)/diethylaluminium chloride [$V(acac)_3/AlEt_2Cl$] and vanadium(III)(tris-acetylacetonate)/methylaluminoxane [$V(acac)_3/MAO$]. Further details relating to said catalytic systems may be found, for example, in: Natta G. et al., "*Atti Accademia Nazionale dei Lincei—Classe di Scienze fisiche, matematiche e naturali*" (1961), vol. 31(5), p. 189 and "*Chemical Abstracts*" (1962), vol. 57, p. 4848; Porri L. et al., "*Die Makromolekulare Chemie*" (1963), vol. 61(1), pp. 90-103; Ricci G. et al., "*Polymer Communication*" (1991), vol. 32, pp. 514-517; Ricci G. et al., "*Journal of Polymer Science Part A: Polymer Chemistry*" (2007), vol. 45(20), pp. 4635-4646.

Some of the above-stated homogeneous catalytic systems, for example vanadium(III)-(tris-acetylacetonate)/triethylaluminium [$V(acac)_3/AlEt_3$], are of some interest for the production of 1,2-polybutadiene, as described, for example, in Natta G. et al., "*La Chimica e L'Industria*" (1959), vol. 41, p. 526 and "*Chemical Abstracts*" (1960), vol. 54, p. 1258.

Catalytic systems obtained by combining cyclopentadienyl derivatives of vanadium such as, for example, bis (cyclopentadienyl)chlorovanadium/methylaluminoxane ($VCp_2Cl/MAO$) and cyclopentadienyltrichloro(tris-triethylphospine)vanadium(IV)/methylaluminoxane [$VCpCl_3(PEt_3)_3/MAO$], are capable of yielding a polybutadiene with a predominantly 1,4-cis structure (1,4-cis unit content of about 85%). Further details relating to said catalytic systems may be found, for example, in: Ricci G. et al., "*Polymer*" (1996), vol. 37(2), pp. 363-365; Porri L. et al., "*Metalorganic Catalyst for Synthesis and Polymerization*" (1999), Kaminsky W. ed., Springer-Verlag Berlin Heidelberg, pp. 519-530.

It is also known that catalytic systems based on vanadium are also active in the polymerisation of isoprene. In particular, the aluminiumtrialkyl/vanadium(III)chloride catalytic system ($AlR_3/VCl_3$ in which R=methyl, ethyl, propyl, butyl, preferably ethyl), yields polyisoprene with a high 1,4-trans unit content, although the level of activity is rather low. Preferably, said polymerisation is carried out using an Al/V molar ratio preferably ranging from 3 to 6, in the presence of an aliphatic solvent (e.g., n-heptane), at a relatively low temperature, preferably ranging from 20° C. to 50° C.

Complexes of metals with β-ketoimines or β-ketoamines are also known from the literature.

For example, Martin D. F. et al., in "*Journal of the American Chemical Society*" (1961), vol. 83, pp. 73-75, report the synthesis and characterisation of β-ketoimine complexes of divalent metals such as, for example, copper, beryllium, nickel, cobalt, zinc, manganese.

Collman et al., in "*Inorganic Syntheses*" (1966), vol. 8, pp. 149-153, report the synthesis and characterisation of tris(4-p-toluidino-3-penten-2-onato)chromium(III).

Chen H.-Y. et al., in "*Journal of Molecular Catalysis A: Chemical*" (2011), vol. 339, pp. 61-71, report the synthesis and characterisation of β-ketoimine complexes of zinc, as well as the use thereof in the polymerisation, in particular in "ring-opening polymerisation" (ROP), of lactides.

Complexes of vanadium with imide, imine, β-ketoamine, or ketoimine ligands, are also known from the literature.

Nomura K. et al., in "*Inorganic Chemistry*" (2013), vol. 52, pp. 2607-2614, report the synthesis and the structural analysis of imide complexes of vanadium(V) containing anilido-ketomethylimines as ligands, as well as the effect of said ligands in the dimerisation of ethylene.

Igarashi A. et al., in "*Catalyst*" (2013), vol. 3, pp. 148-156, report the polymerisation of ethylene using catalytic systems comprising imino complexes of vanadium(V) containing (anilido)-methylpyridines or (anilido)-methylquinolines as ligands and halogenated alkylaluminiums.

Igarashi A. et al., in "*Organometallics*" (2012), vol. 31(9), pp. 3575-3581, report the dimerisation/polymerisation of ethylene catalysed by adamantylimido complexes of vanadium(V) containing (2-anilidomethyl)pyridines as ligands, as well as the various factors which have an impact on ethylene reactivity.

Zhang S. et al., in "*Journal of the American Chemical Society*" (2010), vol. 132(13), pp. 4960-4965, report the dimerisation of ethylene catalysed by imido complexes of vanadium(V) containing (2-anilidomethyl)pyridines as ligands, as well as the effect of said ligands in relation to the activity and selectivity of said complexes.

Zhang S. et al., in "*Organometallics*" (2009), vol. 28, pp. 5925-5933, report the synthesis of arylimido complexes of vanadium containing (2-anilidomethyl)pyridines as ligands and the use thereof as catalyst precursors for polymerising olefins.

Röhrscheid F. et al., in "*Inorganic Chemistry*" (1967), vol. 6, no. 9, pp. 1607-1613, report nuclear resonance studies relating to tris(β-ketoamine) complexes of vanadium(III).

Lee J.-I. et al., in "*Journal of Molecular Structure*" (2009), vol. 929, pp. 207-212, report the synthesis, structural characterisation and catalytic activity of bidentate ketoimine complexes of iron(II) and vanadium(III) in the polymerisation of methyl methacrylate (MMA).

Since (co)polymers of conjugated dienes, in particular polybutadiene and polyisoprene, predominantly containing 1,4-trans and 1,4-cis units may advantageously be used for tyre production, in particular for tyre treads, as well as in the shoemaking industry (for example, in the production of shoe soles), there has been great interest in investigating new catalytic systems capable of yielding said (co)polymers.

The Applicant has set itself the problem of finding a new oxo-nitrogenated vanadium complex usable in a catalytic system capable of yielding conjugated diene (co)polymers such as, for example, linear or branched polybutadiene or linear or branched polyisoprene, predominantly containing 1,4-trans and 1,4-cis units, i.e. having a 1,4-trans and 1,4-cis unit content of ≥70%, preferably ranging from 80% to 99%.

The Applicant has now found a new oxo-nitrogenated vanadium complex having the general formula (I) defined below, which is capable of yielding conjugated diene (co) polymers such as, for example, linear or branched polybutadiene or polyisoprene, predominantly containing 1,4-trans and 1,4-cis units, i.e. having a 1,4-trans and 1,4-cis unit content of ≥70%, preferably ranging from 80% to 99%.

The present invention accordingly provides an oxo-nitrogenated vanadium complex having the general formula (I):

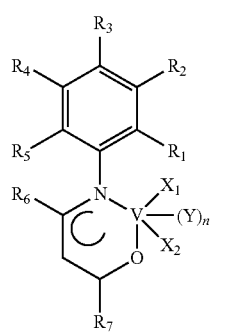

(I)

in which:

$R_1$, $R_2$, $R_3$, $R_4$, $R_5$, $R_6$ and $R_7$, mutually identical or different, represent a hydrogen atom; or are selected from optionally halogenated, linear or branched $C_1$-$C_{20}$, preferably $C_1$-$C_{15}$, alkyl groups, optionally substituted cycloalkyl groups, optionally substituted aryl groups;

$X_1$ and $X_2$, mutually identical or different, represent a halogen atom such as, for example, chlorine, bromine, iodine, preferably chlorine; or are selected from linear or branched $C_1$-$C_{20}$, preferably $C_1$-$C_{15}$, alkyl groups, —OCOR$_8$ groups or —OR$_8$ groups in which $R_8$ is selected from linear or branched $C_1$-$C_{20}$, preferably $C_1$-$C_{15}$, alkyl groups;

Y is selected from ethers such as, for example, diethyl ether, tetrahydrofuran (THF), dimethoxyethane, preferably is tetrahydrofuran (THF);

n is 0 or 1.

For the aim of the present description and of the following claims, unless stated otherwise, definitions of numerical ranges always include the extremes.

For the aim of the present description and of the following claims, the term "comprising" also encompasses the terms "which essentially consists of" or "which consists of".

The term "$C_1$-$C_{20}$ alkyl groups" is taken to mean linear or branched alkyl groups having from 1 to 20 carbon atoms. Specific examples of $C_1$-$C_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

The term "optionally halogenated $C_1$-$C_{20}$ alkyl groups" is taken to mean linear or branched, saturated or unsaturated, alkyl groups having from 1 to 20 carbon atoms, in which at least one of the hydrogen atoms is substituted with a halogen atom such as, for example, fluorine, chlorine, bromine, preferably fluorine, chlorine. Specific examples of $C_1$-$C_{20}$ alkyl groups optionally containing heteroatoms are: fluoromethyl, difluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl, perfluoropentyl, perfluorooctyl, perfluorodecyl.

The term "cycloalkyl groups" is taken to mean cycloalkyl groups having from 3 to 30 carbon atoms. Said cycloalkyl groups may optionally be substituted with one or more, mutually identical or different, groups selected from: halogen atoms; hydroxyl groups; $C_1$-$C_{12}$ alkyl groups; $C_1$-$C_{12}$ alkoxy groups; cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethylcyclopentyl, 2-cyclooctylethyl, methylcyclohexyl, methoxycyclohexyl, fluorocyclohexyl, phenylcyclohexyl.

The term "aryl groups" is taken to mean aromatic carbocyclic groups. Said aromatic carbocycles may optionally be substituted with one or more, mutually identical or different, groups selected from: halogen atoms such as, for example, fluorine, chlorine, bromine; hydroxyl groups; $C_1$-$C_{12}$ alkyl groups; $C_1$-$C_{12}$ alkoxy groups; cyano groups; amino groups; nitro groups. Specific examples of aryl groups are: phenyl, methylphenyl, trimethylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene, anthracene.

According to a preferred embodiment of the present invention, in said oxo-nitrogenated vanadium complex having the general formula (I):

$R_1$, $R_2$, $R_3$, $R_4$, $R_5$, $R_6$ and $R_7$, mutually identical or different, represent a hydrogen atom; or are selected from linear or branched $C_1$-$C_{20}$, preferably $C_1$-$C_{15}$ alkyl groups, preferably are methyl;

$X_1$ and $X_2$, mutually identical, represent a halogen atom such as, for example, chlorine, bromine, iodine, preferably are chlorine;

Y is tetrahydrofuran (THF);

n is 0 or 1.

The oxo-nitrogenated vanadium complex having the general formula (I) should be understood in accordance with the present invention to have any physical form such as, for example, an isolated and purified solid form, a form solvated with an appropriate solvent, or that supported on suitable organic or inorganic solids, preferably having a granular or pulverulent physical form.

The oxo-nitrogenated vanadium complex having the general formula (I) is prepared starting from ligands known in the art.

Specific examples of ligands usable for the aim of the present invention are those having the following formulae (L1)-(L3):

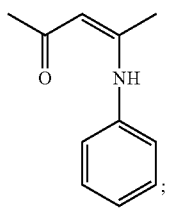

(L1)

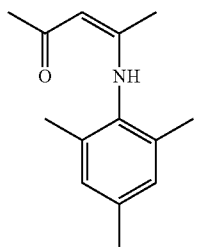

(L2)

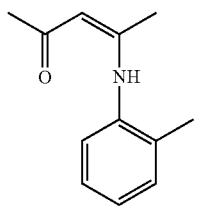

(L3)

Said ligands having the formulae (L1)-(L3) may be prepared by way of processes known in the art. For example, said ligands having the formulae (L1)-(L3) may be prepared by way of condensation reactions between β-diketones with anilines, in the presence of formic acid in catalytic quantity, as described, for example, by Patil S. A. in "*Synthetic Communications*" (2013), vol. 43, issue 7, pp. 2349-2364; or by reaction of β-dicarbonyl compounds with amines, in the presence of indium tribromide in catalytic quantity, as described, for example, by Zhang Z.-H. in "*Advanced Synthesis & Catalysis*" (2006), issue 1-2, pp. 184-190.

The oxo-nitrogenated vanadium complex having the general formula (I) may be prepared in accordance with processes known in the art. For example, said oxo-nitrogenated vanadium complex may be prepared by reaction between vanadium compounds having the general formula $V(X)_3$ in which V is vanadium and X is a halogen atom such as, for example, chlorine, bromine, iodine, preferably chlorine, as such or complexed with ethers [for example, diethyl ether, tetrahydrofuran (THF), dimethoxyethane], preferably complexed with tetrahydrofuran (THF), with the ligands having the above-mentioned formulae (L1)-(L3), in a molar ratio of ligand (L)/vanadium (V) ranging from 1 to 1.5, the process preferably being carried out in the presence of at least one solvent which may be selected, for example, from: chlorinated solvents (for example, methylene chloride), ether solvents [for example, tetrahydrofuran (THF)], alcohol solvents (for example, butanol), hydrocarbon solvents (for example, toluene) or mixtures thereof, at room temperature or above. The resultant oxo-nitrogenated vanadium complex may subsequently be recovered by means of known prior art methods such as, for example, precipitation by means of a non-solvent (for example, pentane, hexane), followed by separation by means of filtration or decantation and optional subsequent dissolution in an appropriate solvent followed by crystallisation at low temperature.

For the aim of the present description and of the following claims, the phrase "room temperature" is taken to mean a temperature ranging from 20° C. to 25° C.

As stated above, the present invention further relates to a catalytic system for (co)polymerising conjugated dienes comprising said oxo-nitrogenated vanadium complex having the general formula (I).

The present invention accordingly further provides a catalytic system for (co)polymerising conjugated dienes comprising:
(a) at least one oxo-nitrogenated vanadium complex having the general formula (I);
(b) at least one co-catalyst selected from organo-derivatives of aluminium, preferably from:
($b_1$) aluminium compounds having the general formula (II):

$$Al(R_9)(R_{10})(R_{11}) \qquad (II)$$

in which $R_9$ represents a hydrogen atom, or a fluorine atom, or is selected from linear or branched $C_1$-$C_{20}$ alkyl groups, cycloalkyl groups, aryl groups, alkylaryl groups, arylalkyl groups, alkoxy groups; $R_{10}$ and $R_{11}$, mutually identical or different, are selected from linear or branched $C_1$-$C_{20}$ alkyl groups, cycloalkyl groups, aryl groups, alkylaryl groups, arylalkyl groups;

($b_2$) aluminoxanes having the general formula (III):

$$(R_{12})_2-Al-O-[-Al(R_{13})-O-]_m-Al-(R_{14})_2 \qquad (III)$$

in which $R_{12}$, $R_{13}$ and $R_{14}$, mutually identical or different, represent a hydrogen atom, or a halogen atom such as, for example, chlorine, bromine, iodine, fluorine, or are selected from linear or branched $C_1$-$C_{20}$ alkyl groups, cycloalkyl groups, aryl groups, said groups being optionally substituted with one or more atoms of silicon or germanium; and m is an integer ranging from 0 to 1000;

($b_3$) partially hydrolysed organo-aluminium derivatives;
($b_4$) halogen alkylaluminiums having the general formula (IV) or (V):

$$Al(R_{15})_p(X_3)_{3-p} \qquad (IV)$$

$$Al_2(R_{15})_q(X_3)_{3-q} \qquad (V)$$

in which p is 1 or 2; q is an integer ranging from 1 to 5; $R_{15}$, mutually identical or different, are selected from linear or branched $C_1$-$C_{20}$ alkyl groups; $X_3$ represents an atom of chlorine or bromine, preferably chlorine;

or mixtures thereof.

Specific examples of aluminium compounds having the general formula (II) which are particularly useful for the aim of the present invention are: diethylaluminium hydride, di-n-propylaluminium hydride, di-n-butylaluminium hydride, di-iso-butylaluminium hydride (DIBAH), diphenylaluminium hydride, di-p-tolylaluminium hydride, dibenzylaluminium hydride, diethylaluminium hydride, phenyl-n-propylaluminium hydride, p-tolylethylaluminium hydride, p-tolyl-n-propylaluminium hydride, p-tolyl-iso-propylaluminium hydride, benzylethylaluminium hydride, benzyl-n- propylaluminium hydride, benzyl-iso-propylaluminium hydride, diethylaluminium ethoxide, di-iso-butylaluminium ethoxide, dipropylaluminium ethoxide, trimethylaluminium, triethylaluminium (TEA), tri-n-propylaluminium, tri-iso-butylaluminium (TIBA), tri-n-butylaluminium, tripentylaluminium, trihexylaluminium, tricyclohexylaluminium, trioctylaluminium, triphenylaluminium, tri-p-tolylaluminium, tribenzylaluminium, ethyldiphenylaluminium, ethyldi-p-tolylaluminium, ethyldibenzylaluminium, diethylphenylaluminium, diethyl-p-tolylaluminium, diethybenzylaluminium. Triethylaluminium (TEA), tri-n-propylaluminium, tri-iso-butylaluminium (TIBA), trihexylaluminium, di-iso-butylaluminium hydride (DIBAH), diethylaluminium fluoride, are particularly preferred.

As is known, aluminoxanes are compounds containing Al—O—Al bonds, with a variable O/Al ratio, which are obtainable according to processes known in the art such as, for example, by reaction, under controlled conditions, of an alkylaluminium, or of an alkylaluminium halide, with water or with other compounds containing predetermined quantities of available water, such as, for example, in the case of the reaction of trimethylaluminium with aluminium sulfate hexahydrate, copper sulfate pentahydrate, or iron sulfate pentahydrate.

Said aluminoxanes and, in particular, methylaluminoxane (MAO), are compounds obtainable by means of known processes of organometallic chemistry such as, for example, by addition of trimethylaluminium to a suspension of aluminium sulfate hydrate in hexane.

Specific examples of aluminoxanes having the general formula (III) which are particularly useful for the aim of the present invention are: methylaluminoxane (MAO), ethylaluminoxane, n-butylaluminoxane, tetra-iso-butylaluminoxane (TIBAO), tert-butylaluminoxane, tetra-(2,4,4-trimethylpentyl)aluminoxane, tetra-(2,3-dimethylbutyl)aluminoxane (TDMBAO), tetra-(2,3,3-trimethylbutyl)aluminoxane (TTMBAO). Methylaluminoxane (MAO), as such or in the "dry" form (dry MAO) is particularly preferred.

Further details relating to aluminoxanes having the general formula (III) may be found in international patent application WO 2011/061151.

The partially hydrolysed organo-derivatives of aluminium ($b_3$), are preferably selected from among aluminium compounds having the general formula (II) supplemented with at least one protonating compound, the aluminium compound having the general formula (II) and the protonating compound being used in a molar ratio ranging from 0.001:1 to 0.2:1. Preferably, said protonating compound may be selected, for example, from: water; alcohols such as, for example, methanol, ethanol, iso-propyl alcohol, n-propyl alcohol, tert-butanol, iso-butyl alcohol, n-butyl alcohol; high molecular weight alcohols, such as, for example, 1-decanol, 2-undecanol; carboxylic acids such as, for example, stearic acid; or mixtures thereof. Water is particularly preferred.

Specific examples of halogen alkylaluminiums having the general formula (IV) or (V) are: diethylchloroaluminium (AlEt$_2$Cl), dimethylaluminium chloride (AlMe$_2$Cl), ethylaluminium dichloride (AlEtCl$_2$), di-iso-butylaluminium chloride [Al(i-Bu)$_2$Cl], ethylaluminium sesquichloride (Al$_2$Et$_3$Cl$_3$), methylaluminium sesquichloride (Al$_2$Me$_3$Cl$_3$).

In general, the formation of the catalytic system comprising the oxo-nitrogenated vanadium complex having the general formula (I) and the co-catalyst (b), is preferably carried out in an inert liquid medium, more preferably in a hydrocarbon solvent. The oxo-nitrogenated vanadium complex having the general formula (I) and the co-catalyst (b), as well as the specific methodology used, may be selected on the basis of the molecular structures and of the desired result, on the basis of the details similarly reported in the relevant literature available to a person skilled in the art for other transition metal complexes with ligands of various kinds such as, for example, in: Ricci G. et al., "*Advances in Organometallic Chemistry Research*" (2007), Yamamoto K. ed., Nova Science Publisher, Inc., USA, pp. 1-36; Ricci G. et al., "*Coordination Chemistry Reviews*" (2010), vol. 254, pp. 661-676; Ricci G. et al., "*Ferrocenes: Compounds, Properties and Applications*" (2011), Elisabeth S. Phillips ed., Nova Science Publisher, Inc., USA, pp. 273-313; Ricci G. et al., "*Chromium: Environmental, Medical and Material Studies*" (2011), Margaret P. Salden ed., Nova Science Publisher, Inc., USA, pp. 121-140; Ricci G. et al., "*Cobalt: Characteristics, Compounds, and Applications*" (2011), Lucas J. Vidmar ed., Nova Science Publisher, Inc., USA, pp. 39-81; Ricci G. et al., "*Phosphorus: Properties, Health effects and Environment*" (2012), Ming Yue Chen and Da-Xia Yang eds., Nova Science Publisher, Inc., USA, pp. 53-94.

Preferably, when used to form a catalytic system for (co)polymerisation in accordance with the present invention, the (co)catalysts (b) may be brought into contact with an oxo-nitrogenated vanadium complex having the general formula (I) in proportions such that the molar ratio between the vanadium present in the oxo-nitrogenated vanadium complex having the general formula (I) and the aluminium present in the (co)catalysts (b) may be ranging from 1 to 10000, preferably ranging from 50 to 1000. The sequence in which the oxo-nitrogenated vanadium complex having the general formula (I) and the (co)catalyst are brought into contact with one another is not particularly critical.

For the aim of the present description and of the following claims, the terms "mole" and "molar ratio" are used both with reference to compounds composed of molecules, and with reference to atoms and ions, so not using the terms gram-atom or atomic ratio for the latter, despite these terms being scientifically more correct.

For the aim of the present invention, other additives or components may optionally be added to the above-stated catalytic system in such a manner as to adjust it to meet specific practical requirements. The resultant catalytic systems should thus be considered to be included in the scope of the present invention. Additives and/or components which may be added during production and/or formulation of the catalytic system provided by the present invention are, for example: inert solvents, such as, for example, aliphatic and/or aromatic hydrocarbons; aliphatic and/or aromatic ethers; weakly coordinating additives (e.g., Lewis bases) selected, for example, from non-polymerisable olefins; sterically hindered or electron-poor ethers; halogenating agents such as, for example, silicon halides, halogenated, preferably chlorinated, hydrocarbons; or mixtures thereof.

Said catalytic system may be prepared, as has already been mentioned above, in accordance with known prior art methods.

For example, said catalytic system may be prepared separately (preformed) and subsequently introduced into the (co)polymerisation environment. In this connection, said catalytic system may be prepared by reacting at least one oxo-nitrogenated vanadium complex (a) having the general formula (I) with at least one co-catalyst (b), optionally in the presence of other additives or components selected from those mentioned above, in the presence of a solvent such as, for example, toluene, heptane, at temperatures ranging from 20° C. to 60° C., for a time ranging from 10 seconds to 10 hours, preferably ranging from 30 seconds to 5 hours.

Alternatively, said catalytic system may be prepared in situ, i.e. directly in the (co)polymerisation environment. In this connection, said catalytic system may be prepared by separately introducing the oxo-nitrogenated vanadium complex (a) having the general formula (I), the co-catalyst (b) and the preselected conjugated diene(s) to be (co)polymerised, working under the conditions in which (co)polymerisation is carried out.

Further details relating to the production of said catalytic system may be found in the examples shown below.

For the aim of the present invention, the above-stated catalytic systems may also be supported on inert solids, preferably composed of oxides of silicon and/or of aluminium, such as, for example, silica, alumina or aluminosilicates. Said catalytic systems may be supported using known supporting methods generally involving contact, in a suitable inert liquid medium, between the support, optionally activated by heating to temperatures of above 200° C., and one or both of components (a) and (b) of the catalytic system provided by the present invention. It is not necessary, for the aims of the present invention, for both components to be supported, it also being possible for just the oxo-nitrogenated vanadium complex (a) having the general formula (I) or the co-catalyst (b) to be present on the surface of the support. In this latter case, the component missing from the surface is subsequently brought into contact with the supported component at the time at which it is desired to form the polymerisation-active catalyst.

Also included in the scope of the present invention are the oxo-nitrogenated vanadium complex having the general formula (I), and the catalytic systems based thereon, which have been supported on a solid by means of functionalisation of the latter and formation of a covalent bond between the solid and the oxo-nitrogenated vanadium complex having the general formula (I).

Furthermore, the present invention relates to a process for (co)polymerising conjugated dienes, characterised in that it uses said catalytic system.

The quantity of oxo-nitrogenated vanadium complex (a) having the general formula (I) and of co-catalyst (b) which may be used in the (co)polymerisation of conjugated dienes varies depending on the (co)polymerisation process which it is desired to carry out. Said quantity is in any event such that a molar ratio between the vanadium (V) present in the oxo-nitrogenated vanadium complex having the general formula (I) and the metal present in the co-catalyst (b), i.e. aluminium, between the above-mentioned values is obtained.

Specific examples of conjugated dienes which may be (co)polymerised using the catalytic system according to the present invention are: 1,3-butadiene, 2-methyl-1,3-butadiene (isoprene), 2,3-dimethyl-1,3-butadiene, 1,3-pentadiene, 1,3-hexadiene, cyclo-1,3-hexadiene. 1,3-Butadiene, isoprene are preferred. The above-stated (co)polymerisable conjugated dienes may be used alone or as a mixture of two or more dienes. In this latter case, namely using a mixture of two or more dienes, a copolymer will be obtained.

According to a particularly preferred embodiment, the present invention relates to a process for polymerising 1,3-butadiene or isoprene, characterised in that it uses said catalytic system.

Generally, said (co)polymerisation may be carried out in the presence of a polymerisation solvent generally selected from inert organic solvents such as, for example: saturated aliphatic hydrocarbons such as, for example, butane, pentane, hexane, heptane, or mixtures thereof; saturated cycloaliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof. The (co)polymerisation solvent is preferably selected from aromatic or halogenated hydrocarbons.

Alternatively, said (co)polymerisation may be carried out in accordance with the "bulk process" using the same conjugated diene(s) which is/are to be (co)polymerised as the (co)polymerisation solvent.

Generally, the concentration of the conjugated diene to be (co)polymerised in said (co)polymerisation solvent is ranging from 5% by weight to 50% by weight, preferably ranging from 10% by weight to 20% by weight, relative to total weight of the mixture of conjugated diene and inert organic solvent.

Generally, said (co)polymerisation may be carried out at temperatures ranging from −70° C. to +100° C., preferably ranging from −20° C. to +80° C.

With regard to pressure, it is preferable to work at the pressure of the components of the mixture which is to be (co)polymerised.

Said (co)polymerisation may be carried out both continuously and "batchwise".

As stated above, said process makes it possible to obtain (co)polymers of conjugated dienes such as, for example, linear or branched polybutadiene or linear or branched polyisoprene, predominantly containing 1,4-trans and 1,4-cis units, i.e. having a 1,4-trans and 1,4-cis unit content of ≥70%, preferably ranging from 80% to 99%.

Some illustrative, non-limiting examples of the present invention are provided below to assist in understanding the present invention and the implementation thereof.

EXAMPLES

Reagents and Materials

The following list shows the reagents and materials used in the subsequent examples of the invention, any optional pretreatments and the manufacturers thereof:

anhydrous vanadium trichloride (Aldrich): degree of purity 99.9%, used as such;

vanadium(III) chloride(tris-tetrahydrofuran) [$VCl_3(THF)_3$]: prepared as described by Manzer L. E. et al., "*Inorganic Syntheses*" (1982), vol. 21, pp. 135-140;

2,4-pentanedione (Aldrich): used as such;

aniline (Aldrich): distilled under reduced pressure and stored under an inert atmosphere;

2,4,6-trimethylaniline (Aldrich): used as such;

o-toluidine (Aldrich): used as such;

formic acid (Aldrich): used as such;

ethyl ether (Aldrich): used as such;

toluene (Fluka): degree of purity >99.5%, refluxed over sodium (Na) for about 8 hours, then distilled and stored over molecular sieves under nitrogen;

pentane (Fluka): degree of purity >99%, refluxed over sodium/potassium (Na/K) for about 8 hours, then distilled and stored over molecular sieves under nitrogen;

hexane (Aldrich): used as such;

1,3-butadiene (Air Liquide): pure, ≥99.5%, evaporated from the container before each production, dried by being passed through a column packed with molecular sieves and condensed inside the reactor which has been pre-cooled to −20° C.;

isoprene (Aldrich): pure, ≥99%, refluxed over calcium hydride for 2 hours, then distilled "trap-to-trap" and stored under a nitrogen atmosphere at 4° C.;

methylaluminoxane (MAO) (10% by weight solution in toluene) (Aldrich): used as such, or in "dry" form (dry MAO) obtained by removing the free trimethylaluminium together with the solvent from the solution in toluene under a vacuum and drying the resultant residue still under a vacuum;

methanol (Carlo Erba, RPE): used as such, or optionally dried by distillation over magnesium (Mg);

hydrochloric acid, 37% aqueous solution (Aldrich): used as such;

1,2-dichlorobenzene (Aldrich): degree of purity 99%, refluxed over calcium hydride ($CaH_2$) for about 8 hours, then distilled and stored over molecular sieves under nitrogen;

deuterated tetrachloroethylene ($C_2D_2Cl_4$) (Acros): used as such;

deuterated chloroform ($CDCl_3$) (Acros): used as such.

The analysis and characterisation methods stated below were used.

Elemental Analysis a) Determination of Vanadium (V)

The quantity by weight of vanadium (V) in the oxo-nitrogenated vanadium complexes object of the present invention was determined by placing an accurately weighed aliquot, working in a dry box under a stream of nitrogen, of about 30 mg-50 mg of sample in a platinum crucible of about 30 ml, together with a mixture of 1 ml of 40% hydrofluoric acid (HF) (Aldrich), 0.25 ml of 96% sulfuric acid ($H_2SO_4$) (Aldrich) and 1 ml of 70% nitric acid ($HNO_3$) (Aldrich). The crucible was then heated on a plate, increasing the temperature until white sulfuric fumes appeared (about 200° C.). The resultant mixture was cooled to room temperature (20° C.-25° C.), 1 ml of 70% nitric acid ($HNO_3$) (Aldrich) was added and then heated again until fumes appeared. Once the sequence had been repeated twice, a clear, almost colourless solution was obtained. 1 ml of 70% nitric acid ($HNO_3$) (Aldrich) and about 15 ml of water were then added cold and the temperature was raised to 80° C. for about 30 minutes. The sample thus prepared was diluted with MilliQ purity water to an accurately weighed weight of about 50 g, in order to obtain a solution on which an instrumental analytical determination was performed by means of a Thermo Optek IRIS Advantage Duo ICP-OES spectrometer (plasma with optical detection) by comparison with solutions of known concentration. For this aim, a calibration curve in the range from 0 ppm-10 ppm was prepared for each analyte by measuring solutions of known content obtained by weight dilution of certified solutions.

The solution of the sample prepared as above was again weight-diluted in such a manner as to obtain concentrations close to the reference concentrations prior to carrying out spectrophotometric detection. All samples were prepared in duplicate. The results were considered acceptable if the individual results of the duplicate tests differed by no more than 2% relative with respect to the mean value thereof.

b) Determination of Chlorine

To this aim, about 30 mg-50 mg samples of the oxo-nitrogenated vanadium complexes object of the present invention were accurately weighed into 100 ml glass beakers in a dry box under a stream of nitrogen. 2 g of sodium carbonate ($Na_2CO_3$) (Aldrich) were added and, outside the dry box, 50 ml of MilliQ water. The mixture was brought to the boil on a plate and stirred with a magnetic stirrer for about 30 minutes. The mixture was left to cool, sulfuric acid ($H_2SO_4$) (Aldrich) diluted to ⅕ was added until an acidic reaction was obtained and titration was performed with 0.1 N silver nitrate ($AgNO_3$) (Aldrich) with a potentiometric titrator.

c) Determination of Carbon, Hydrogen and Nitrogen

Carbon, hydrogen and nitrogen were determined in the oxo-nitrogenated vanadium complexes provided by the present invention using a Carlo Erba model 1106 automatic analyser.

$^{13}$C-NMR and $^1$H-NMR

The $^{13}$C-NMR and $^1$H-NMR spectra were recorded with a Bruker Avance 400 nuclear magnetic resonance spectrometer using deuterated tetrachloroethylene ($C_2D_2Cl_4$) at 103° C. and hexamethyldisiloxane (HDMS) (Aldrich) as internal standard, or using deuterated chloroform ($CDCl_3$) at 25° C. and tetramethylsilane (TMS) (Aldrich) as internal standard. Polymer solutions having concentrations of 10% by weight relative to the total weight of the polymer solution were used for this aim.

The microstructure of the polymers was determined by analysing the above-stated spectra on the basis of the details reported in the literature by Mochel, V. D., in "*Journal of Polymer Science Part A-1: Polymer Chemistry*" (1972), vol. 10, issue 4, pp. 1009-1018, for polybutadiene, and by Sato H. et al., in "*Journal of Polymer Science: Polymer Chemistry Edition*" (1979), vol. 17, issue 11, pp. 3551-3558, for polyisoprene.

FT-IR Spectra (Solid State, UATR)

The FT-IR spectra (solid state, UATR) were recorded by means of a Bruker IFS 48 spectrophotometer equipped with a Thermo Spectra-Tech horizontal ATR attachment. The section in which the samples are placed for analysis is a Fresnel ATR accessory (Shelton, Conn., USA) which uses zirconium selenide crystals (ZnSe) with an angle of incidence of 45° in the horizontal direction.

The FT-IR spectra (solid state, UATR) of the oxo-nitrogenated vanadium complexes object of the present invention were obtained by inserting samples of the oxo-nitrogenated vanadium complex for analysis into said section.

FT-IR Spectra

The FT-IR spectra were recorded by means of Thermo Nicolet Nexus 670 and Bruker IFS 48 spectrophotometers.

The FT-IR spectra of the polymers were obtained from polymer films on potassium bromide (KBr) pellets, said films being obtained by deposition of a solution of the polymer for analysis in hot 1,2-dichlorobenzene. The concentration of the analysed polymer solutions was 10% by weight relative to the total weight of the polymer solution.

Thermal Analysis (DSC)

DSC ("Differential Scanning Calorimetry") thermal analysis for the aim of determining the melting point ($T_m$) and the crystallisation temperature ($T_c$) of the polymers obtained was carried out using a Perkin Elmer Pyris differential scanning calorimeter. To this aim, 5 mg of polymer were analysed at a scanning speed ranging from 1° C./min to 20° C./min, under an inert nitrogen atmosphere.

DSC ("Differential Scanning Calorimetry") thermal analysis for the aim of determining the glass transition temperature ($T_g$) of the polymers obtained was carried out by means of the above-stated calorimeter using the following temperature programme: isotherm for 3 min at +70° C.; cooling from +70° C. to −90° C. at a rate of 10° C./min; isotherm for 3 min at −90° C.; heating from −90° C. to +70° C. at a rate of 10° C./min.

Determination of Molecular Weight

The molecular weight (MW) of the polymers obtained was determined by GPC ("Gel Permeation Chromatography") working under the following conditions:
Agilent 1100 pump;
Agilent 1100 IR detector;
Mixed-A PL columns;
solvent/eluent: tetrahydrofuran (THF) (Aldrich);
flow rate: 1 ml/min;
temperature: 25° C.;
calculation of molecular mass: Universal Calibration method.

The weight-average molecular weight ($M_w$) and the polydispersion index (PDI) corresponding to the ratio $M_w/M_n$ ($M_n$=number-average molecular weight) are reported.

Mass Spectra

The mass spectra of the ligands obtained were recorded with an AT 95S reverse-geometry, double-focusing spectrometer operated by desorption chemical ionisation (DCI) with iso-butane as reactant gas in positive ion mode. The emission current of the filament was calibrated to 0.1 mA with an electron beam energy of 100 eV and with the temperature of the ion source kept at 90° C.

Example 1

Synthesis of the Ligand Having the Formula (L1)

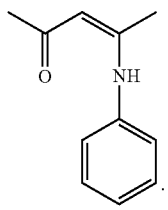

(L1)

5 g (50 mmol) of 2,4-pentanedione together with 100 ml of methanol, a few drops of formic acid and 4.7 g (50 mmol) of aniline were placed in a 500 ml reaction flask equipped with a Dean-Stark trap for azeotropic water removal: the resultant mixture was heated to 85° C. for 4 hours. The mixture was then cooled to room temperature, filtered through a porous membrane and the resultant filtrate was vacuum evaporated, a solid product being obtained. Said solid product was dissolved in ethyl ether (40 ml) and placed in a freezer for 24 hours, a precipitate being obtained. The resultant precipitate was recovered by way of filtration and dried under a vacuum at room temperature, 7 g of a yellowish solid product (yield=80%) having the formula (L1) being obtained.

Elemental analysis [found (calculated for $C_{11}H_{13}NO$)]: C: 75.20% (75.40%); H: 7.50% (7.48%); N: 8.00% (7.99%).
Molecular weight (MW): 175.23.
FT-IR (solid state, UATR, $cm^{-1}$): 1590; 1571.
$^1$H-NMR ($CD_2Cl_2$, δ ppm): 12.49 (s, 1H NH), 8.27 (d, 1H PyH), 7.34-7.28 (m, 2H ArH), 7.19-7.15 (m, 1H ArH), 7.10-7.08 (m, 2H ArH), 5.18 (s, 1H CH), 2.09 (s, 3H $CH_3$), 1.97 (s, 3H $CH_3$).
GC-MS: $M^+$=m/z 175.
FIG. 1 shows the FT-IR spectrum (solid state, UATR) of the resultant ligand (L1).
FIG. 2 shows the $^1$H-NMR spectrum of the resultant ligand (L1).

FIG. 3 shows the GC-MS chromatogram of the resultant ligand (L1).

Example 2

Synthesis of the Ligand Having the Formula (L2)

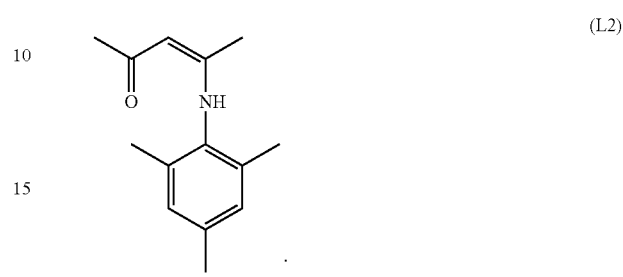

(L2)

5 g (50 mmol) of 2,4-pentanedione together with 75 ml of benzene, a few drops of formic acid and 6.76 g (50 mmol) of 2,4,6-trimethylaniline were placed in a 500 ml reaction flask equipped with a Dean-Stark trap for azeotropic water removal: the resultant mixture was refluxed for 24 hours. The mixture was then cooled to room temperature, filtered through a porous membrane and the resultant filtrate was vacuum evaporated, a solid product being obtained. Said solid product was dissolved in ethyl ether (10 ml) and placed in a freezer for 24 hours, a precipitate being obtained. The resultant precipitate was recovered by way of filtration and dried under a vacuum at room temperature, 4.8 g of a yellowish solid product (yield=44%) having the formula (L2) being obtained.

Elemental analysis [found (calculated for $C_{14}H_{19}NO$)]: C: 77.40% (77.38%); H: 9.00% (8.81%); N: 6.32% (6.45%).
Molecular weight (MW): 217.31.
FT-IR (solid state, UATR, $cm^{-1}$): 1606; 1567.
$^1$H-NMR ($CD_2Cl_2$, δ ppm): 1.61 (s, 3H $CH_3CN$), 2.05 (s, 3H $CH_3CO$), 2.18 (s, 6H 2-$C_6H_2CH_3$), 2.28 (s, 3H 4-$C_6H_2CH_3$), 5.21 (s, 1H CH), 6.92 (s, 2H $C_6H_2$), 11.82 (s, 1H NH).
GC-MS: $M^+$=m/z 217.
FIG. 4 shows the FT-IR spectrum (solid state, UATR) of the resultant ligand (L2).
FIG. 5 shows the $^1$H-NMR spectrum of the resultant ligand (L2).
FIG. 6 shows the GC-MS chromatogram of the resultant ligand (L2).

Example 3

Synthesis of the Ligand Having the Formula (L3)

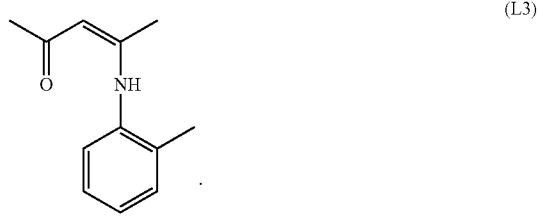

(L3)

5 g (50 mmol) of 2,4-pentanedione together with 75 ml of benzene, a few drops of formic acid and 5.36 g (50 mmol) of o-toluidine were placed in a 500 ml reaction flask equipped with a Dean-Stark trap for azeotropic water removal: the resultant mixture was refluxed for 24 hours. The mixture was then cooled to room temperature, filtered through a porous membrane and the resultant filtrate was vacuum evaporated, a solid product being obtained. Said solid product was dissolved in ethyl ether (10 ml) and placed in a freezer for 24 hours, a precipitate being obtained. The resultant precipitate was recovered by way of filtration and dried under a vacuum at room temperature, 5.7 g of a white solid product (yield=60%) having the formula (L3) being obtained.

Elemental analysis [found (calculated for $C_{12}H_{15}NO$)]: C: 76.31% (76.16%); H: 7.92% (7.99%); N: 7.56% (7.40%).

Molecular weight (MW): 189.0.

FT-IR (solid state, UATR, $cm^{-1}$): 1595; 1560.

$^1$H-NMR ($CD_2Cl_2$, δ ppm): 1.87 (s, 3H $CH_3CN$), 2.11 (s, 3H $CH_3CO$), 2.28 (s, 3H $C_6H_2CH_3$), 5.20 (s, 1H CH), 7.06-7.23 (s, 4H $C_6H_4$), 12.35 (s, 1H NH).

GC-MS: $M^+$=m/z 189.

Example 4

Synthesis of $VCl_2(L1)(thf)$ [Sample GT-298]

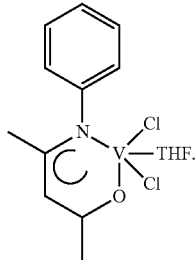

(GT-298)

The vanadium(III) chloride(tris-tetrahydrofuran) [$VCl_3$(THF)$_3$] (348 mg; 0.93 mmol) was introduced into a 50 ml side-arm flask together with a yellow-coloured solution of the ligand having the formula (L1) (164 mg; 0.93 mmol; molar ratio L1/V=1), obtained as described in Example 1, in toluene (20 ml). The resultant mixture, which immediately turned reddish on addition of the vanadium(III) chloride (tris-tetrahydrofuran) [$VCl_3$(THF)$_3$], was refluxed for 2 hours, during which time evolution of acidic gases (HCl) was observed. The resultant suspension was allowed to cool to room temperature, the volume was reduced to about 5 ml by evaporation under a vacuum at room temperature, after which hexane (20 ml) was added. The dark red-coloured solid formed was recovered by way of filtration, washed with hexane (2×5 ml) and dried under a vacuum at room temperature, 325 mg (yield=96%) of a dark red-coloured solid product corresponding to the complex $VCl_2(L1)(thf)$ being obtained.

Elemental analysis [found (calculated for $C_{15}H_{20}Cl_2NO_2V$)]: C: 48.20% (48.93%); H: 5.00% (5.48%); N: 3.42% (3.80%); V: 13.10% (13.84%); Cl: 19.80% (19.26%).

FT-IR (solid state, UATR, $cm^{-1}$): 1592; 1494; 1485.

Figure 1:
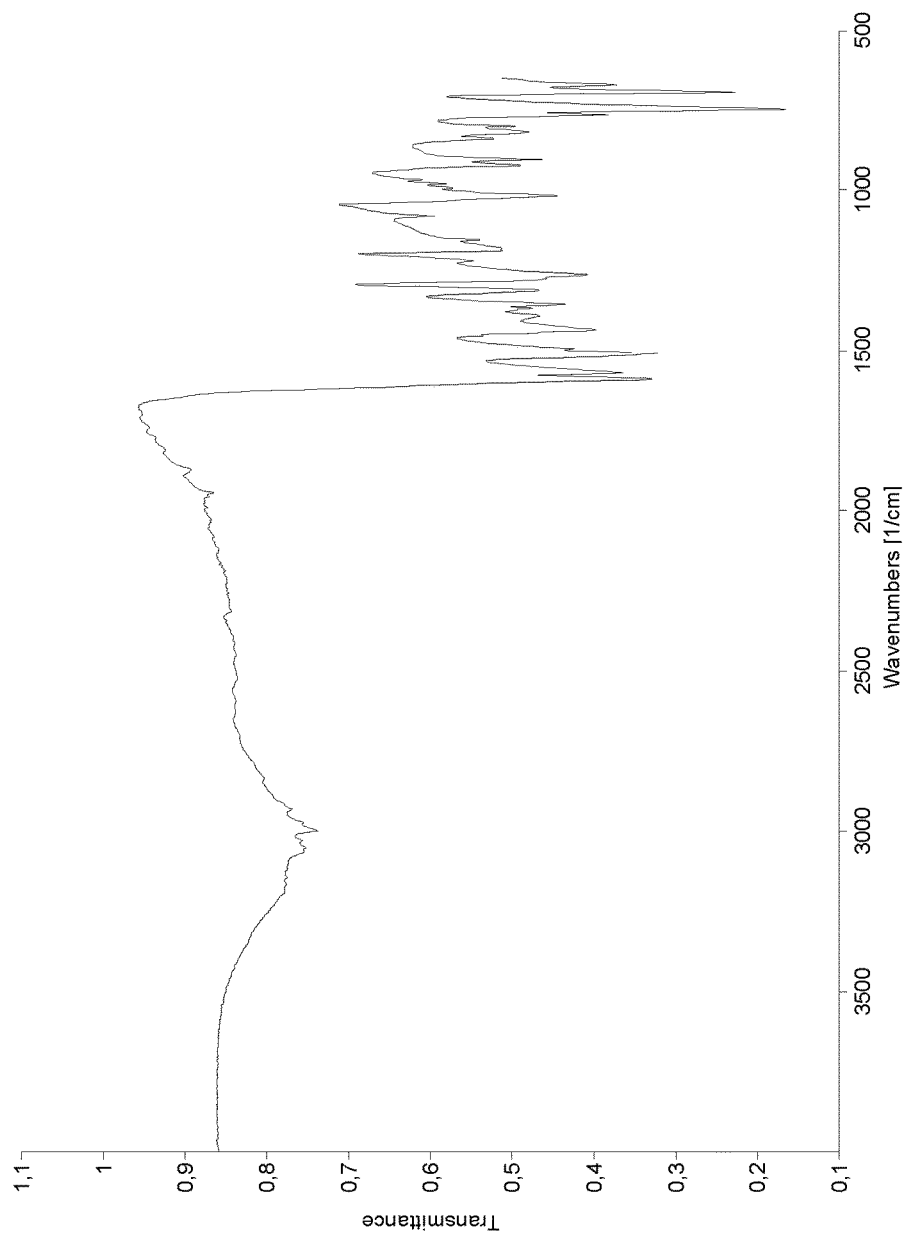
Figure 2:
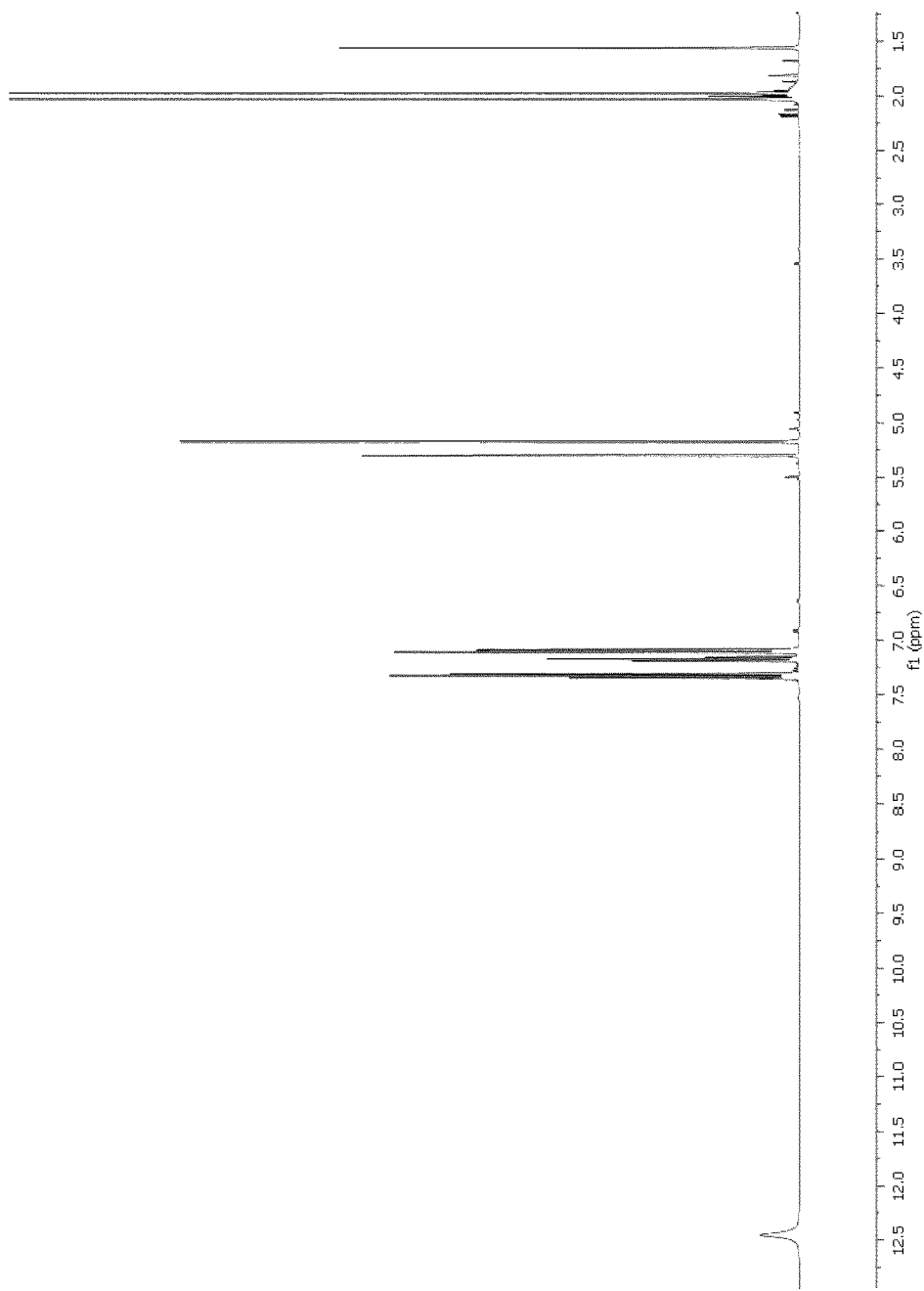
Figure 3:
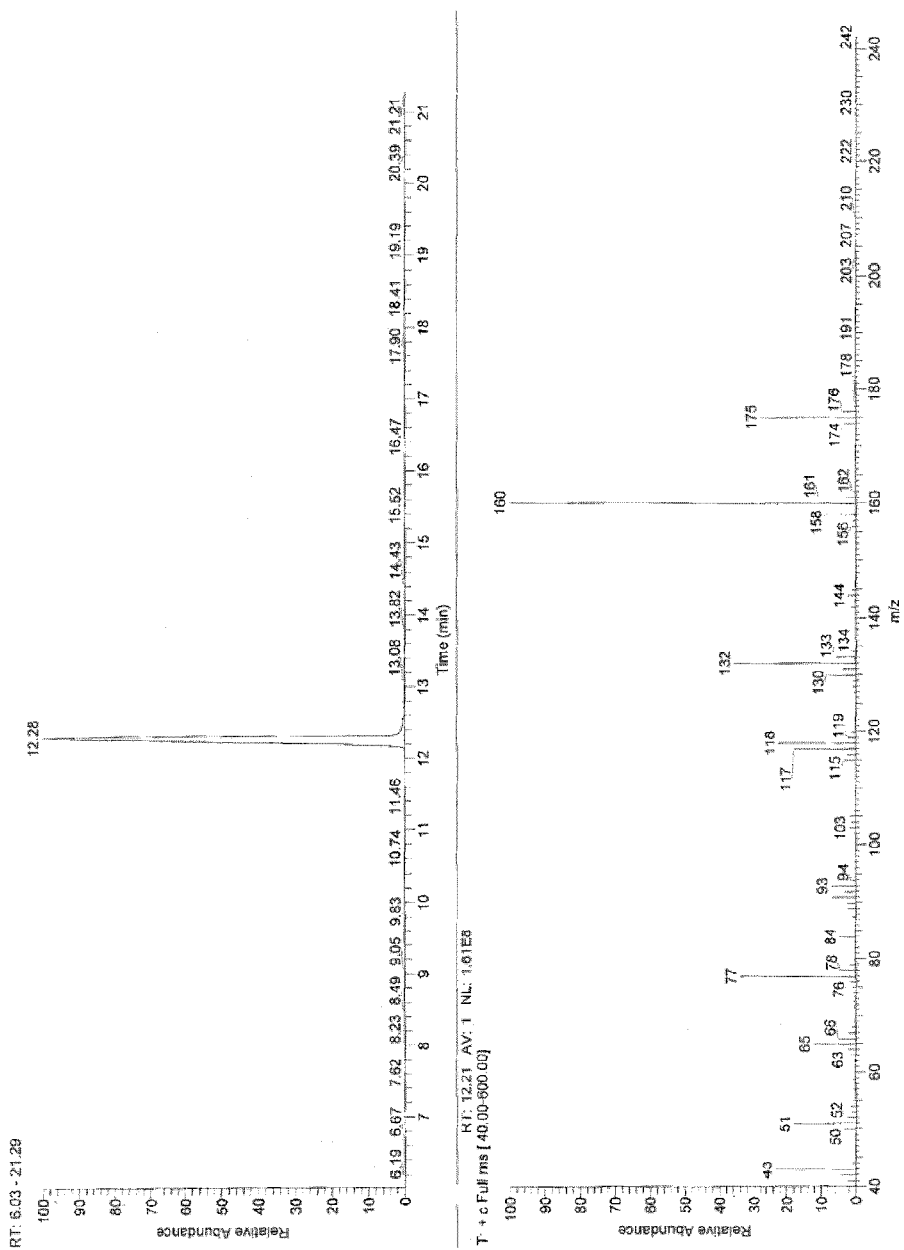
Figure 4:
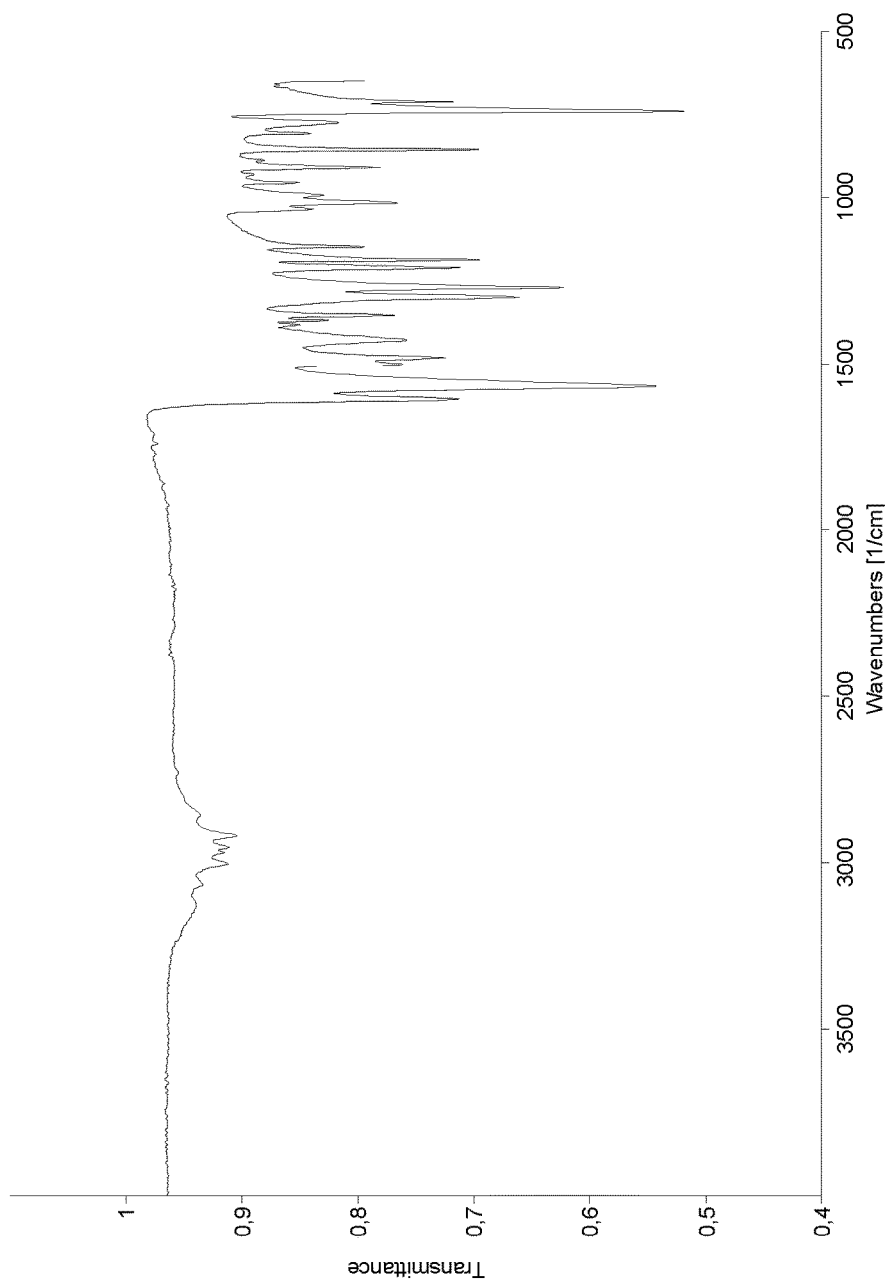
Figure 5:
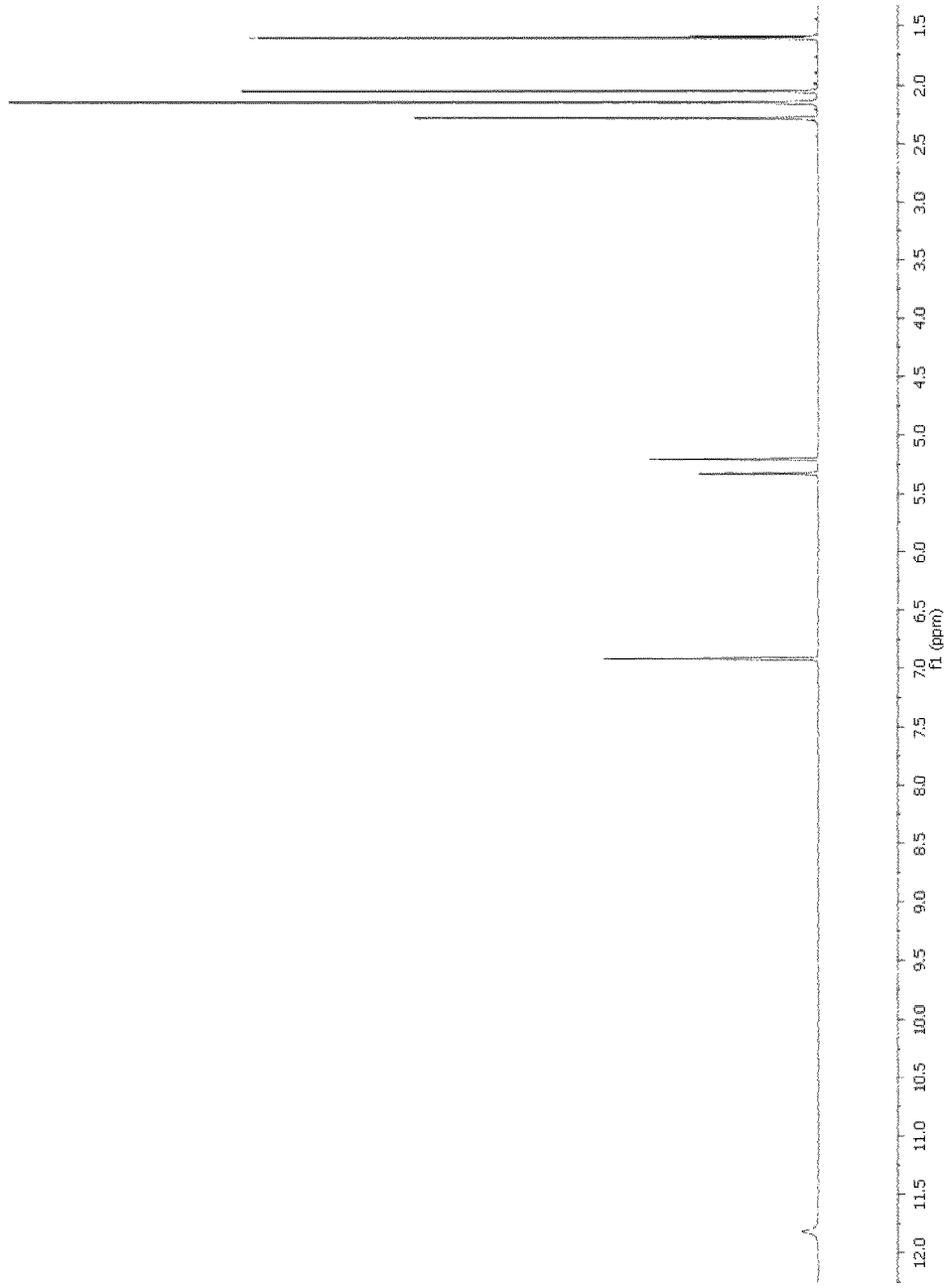
Figure 6:
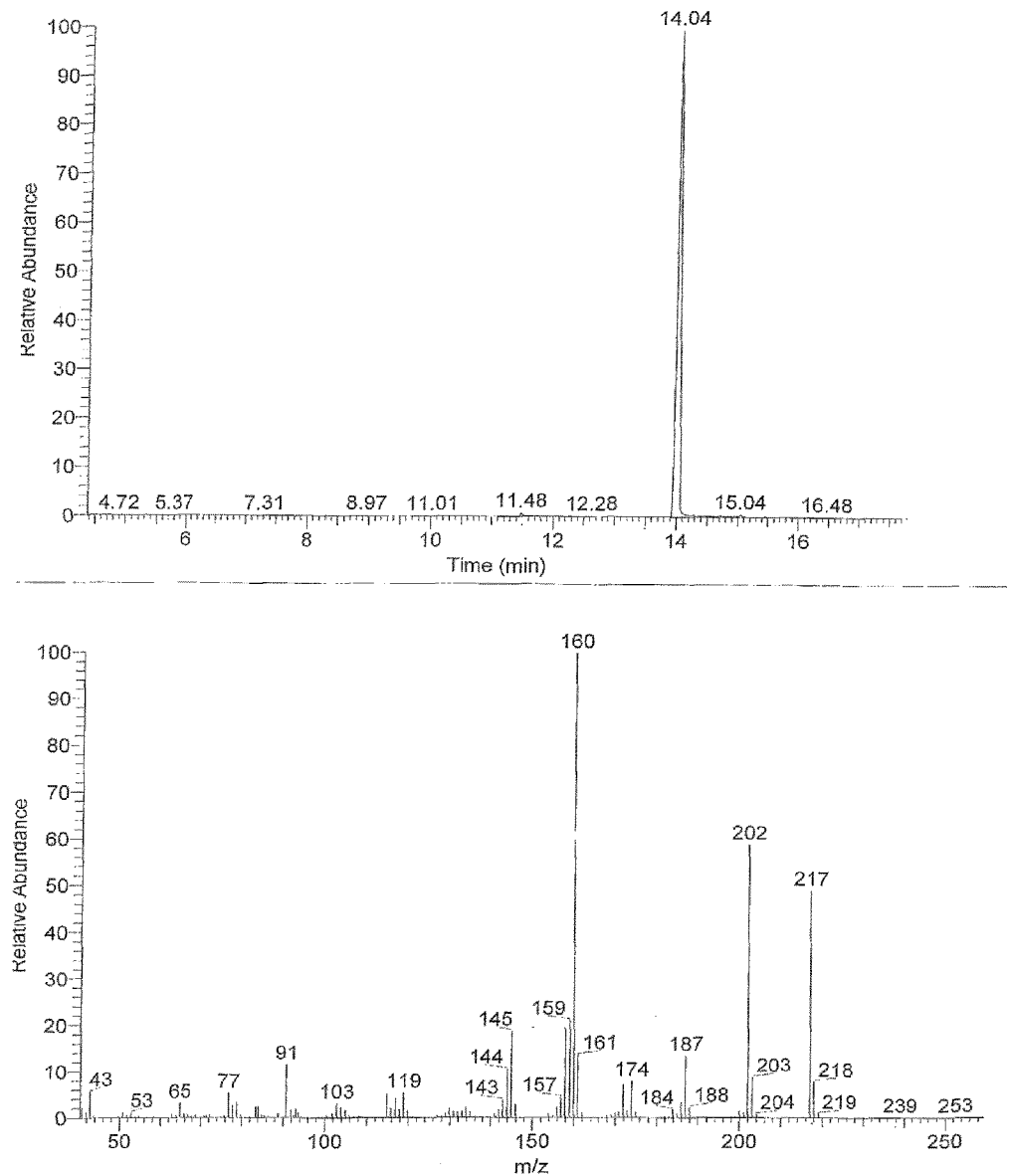
Figure 7:
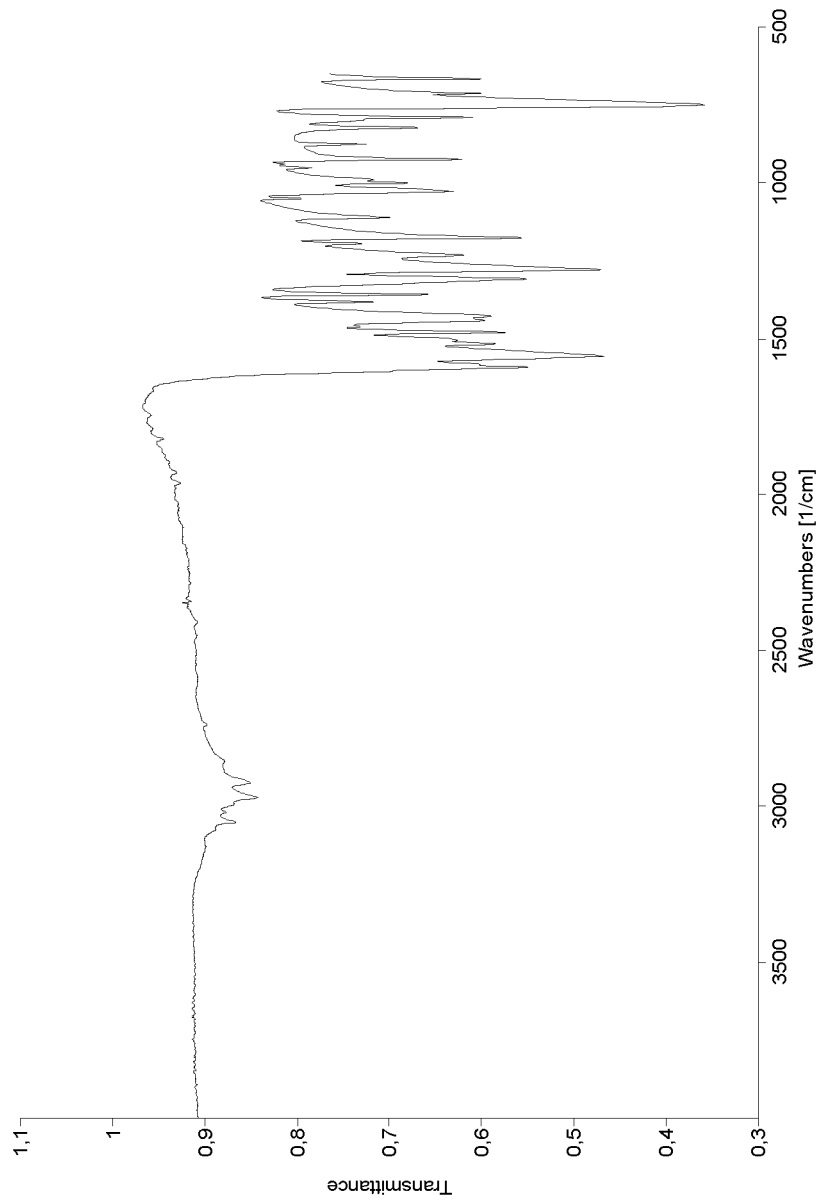
FIG. 7 shows the FT-IR spectrum (solid state, UATR) of the resultant ligand (L3).
Figure 8:
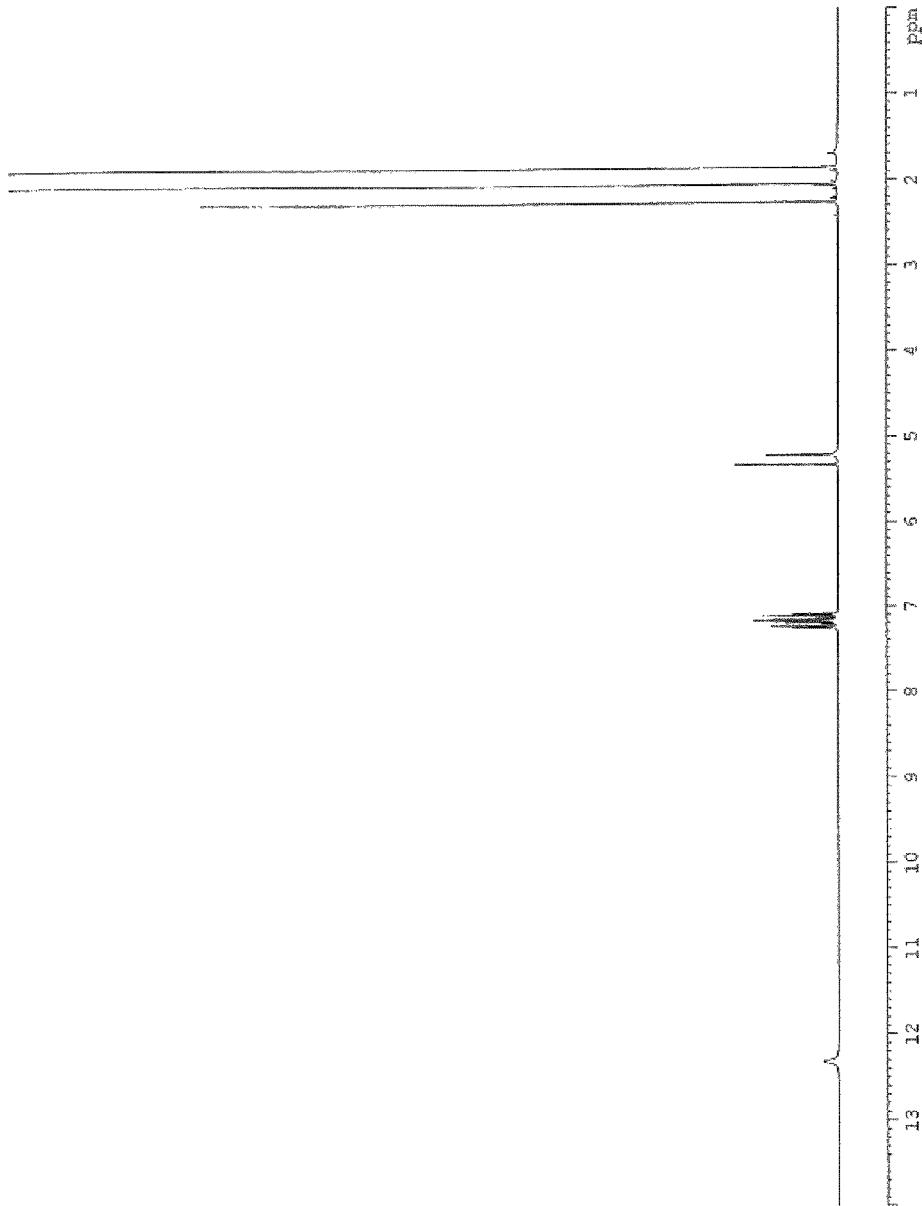
FIG. 8 shows the $^1$H-NMR spectrum of the resultant ligand (L3).
Figure 9:
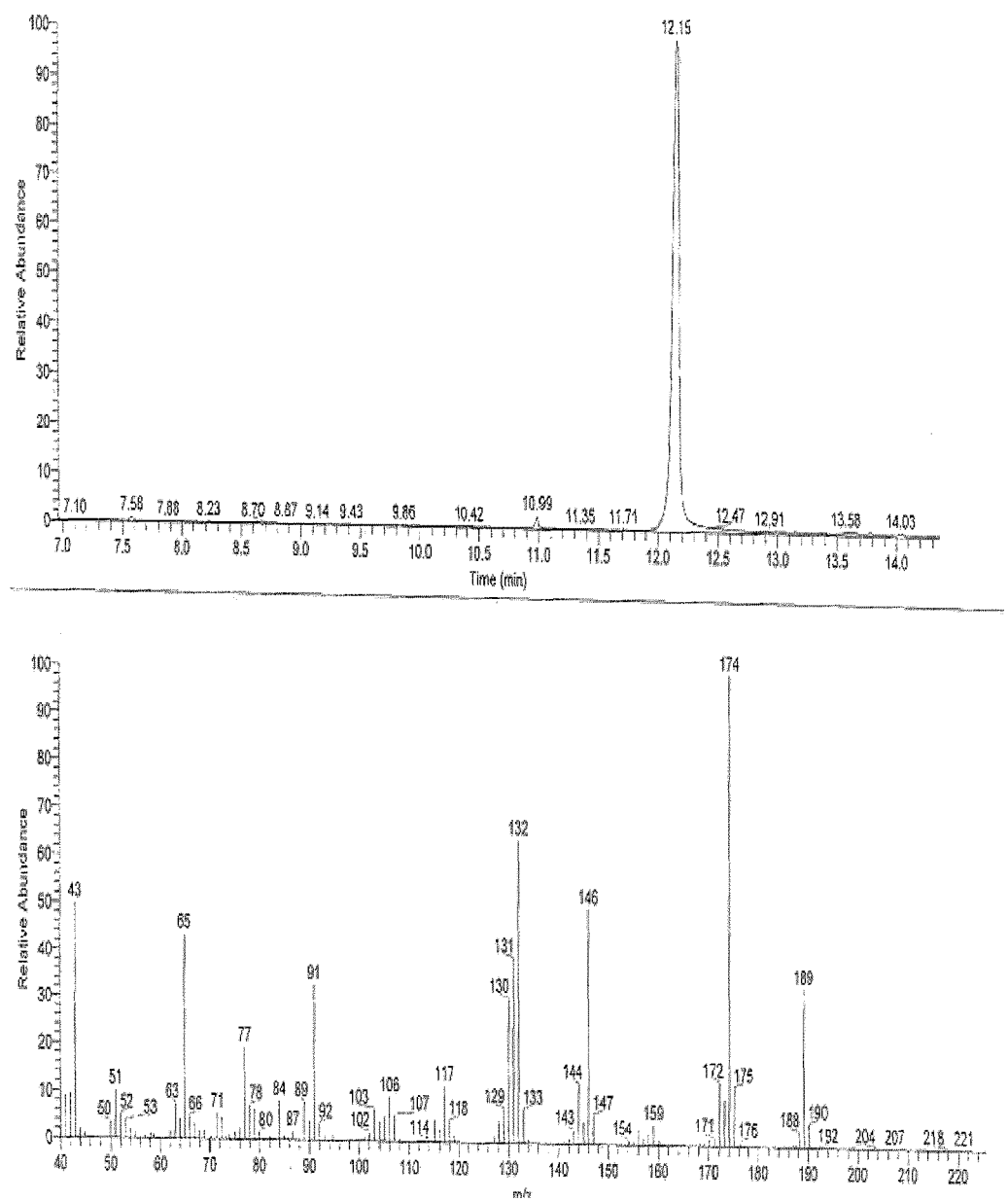
FIG. 9 shows the GC-MS chromatogram of the resultant ligand (L3).
Figure 10:
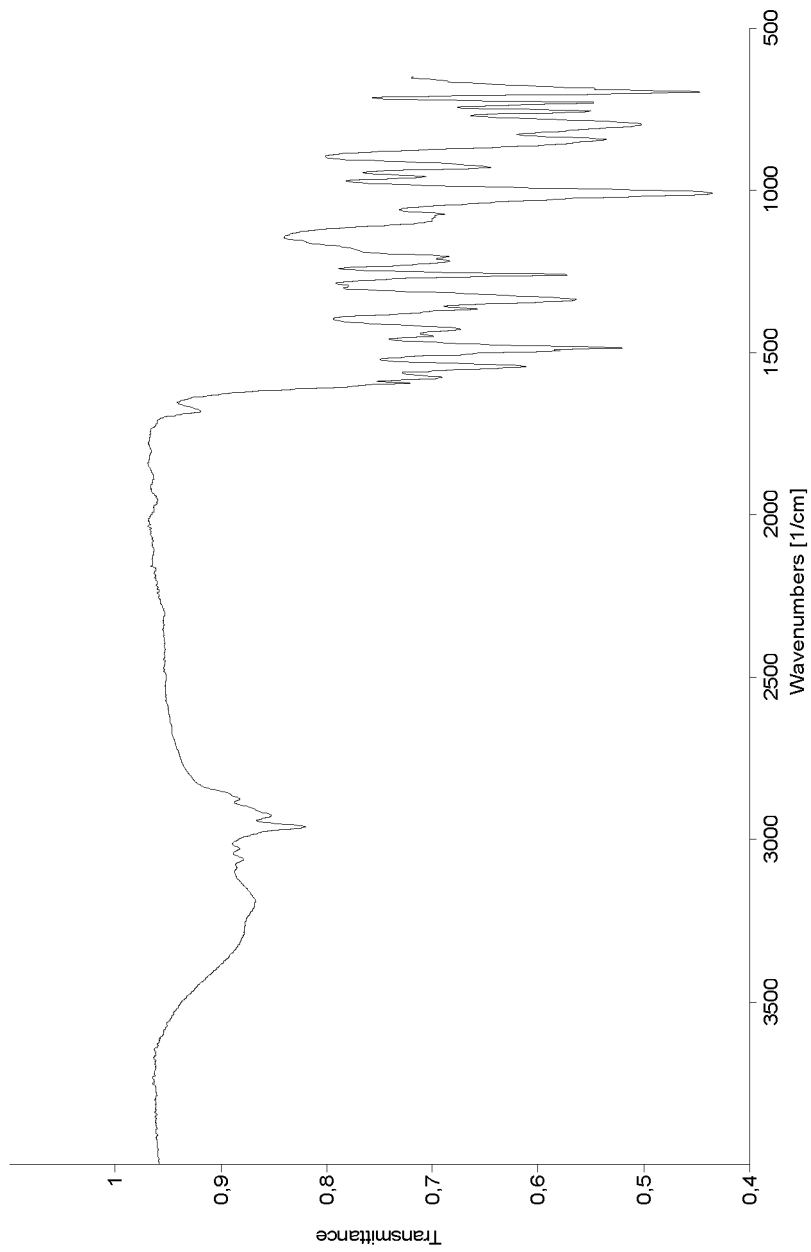

FIG. 10 shows the FT-IR spectrum (solid state, UATR) of the resultant complex $VCl_2(L1)(thf)$.

Example 5

Synthesis of $VCl_2(L2)$ [Sample GT-301]

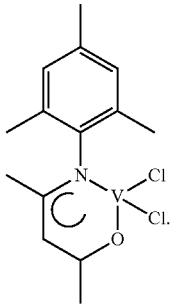

(GT-301)

The vanadium(III) chloride(tris-tetrahydrofuran) [$VCl_3$(THF)$_3$] (374 mg; 1.0 mmol) was introduced into a 50 ml side-arm flask together with a yellow-coloured solution of the ligand having the formula (L2) (218 mg; 1.0 mmol; molar ratio L2/V=1), obtained as described in Example 2, in toluene (20 ml). The resultant mixture, which immediately turned reddish on addition of the vanadium(III) chloride (tris-tetrahydrofuran) [$VCl_3$(THF)$_3$], was refluxed for 3 hours, during which time evolution of acidic gases (HCl) was observed. The resultant suspension was allowed to cool to room temperature, the volume was reduced to about 5 ml by evaporation under a vacuum at room temperature, after which hexane (20 ml) was added. The dark red-coloured solid formed was recovered by way of filtration, washed with hexane (2×2 ml) and dried under a vacuum at room temperature, 235 mg (yield=69%) of a dark red-coloured solid product corresponding to the complex $VCl_2(L2)$ being obtained.

Elemental analysis [found (calculated for $C_{14}H_{18}Cl_2NOV$)]: C: 48.99% (49.73%); H: 5.52% (5.37%); N: 3.82% (4.14%); V: 15.52% (15.06%); Cl: 21.19% (20.97%).

FT-IR (solid state, UATR, $cm^{-1}$): 1542; 1465.

Figure 11:
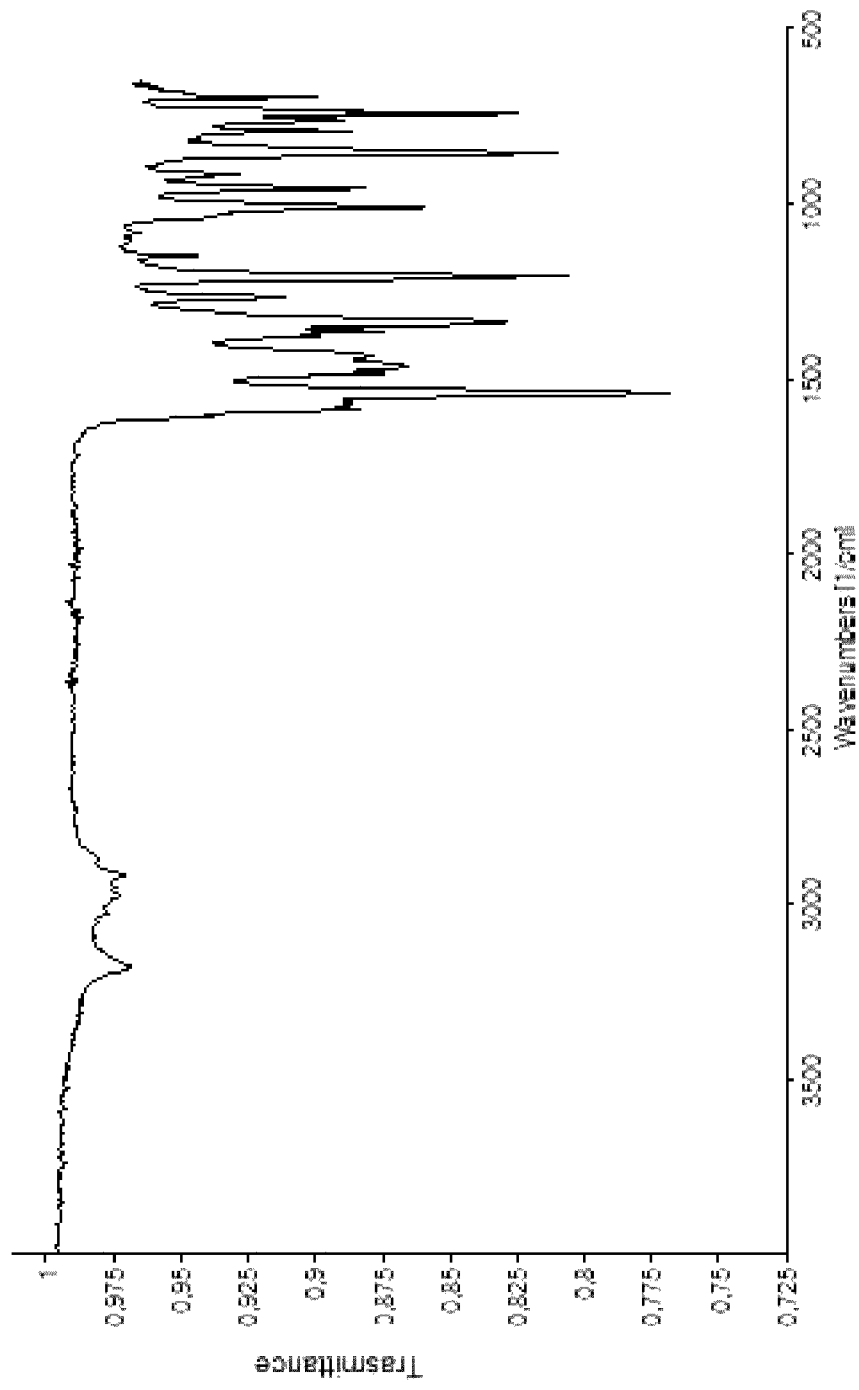

FIG. 11 shows the FT-IR spectrum (solid state, UATR) of the resultant complex $VCl_2(L2)$.

Example 6

Synthesis of $VCl_2(L3)(thf)$ [Sample GT-363]

(GT-363)

The vanadium(III) chloride(tris-tetrahydrofuran) [$VCl_3$(THF)$_3$] (560 mg; 3.56 mmol) was introduced into a 50 ml side-arm flask together with a yellow-coloured solution of the ligand having the formula (L3) (675 mg; 3.57 mmol; molar ratio L3/V=1), obtained as described in Example 3, in toluene (20 ml). The resultant mixture, which immediately turned reddish on addition of the vanadium(III) chloride (tris-tetrahydrofuran) [VCl$_3$(THF)$_3$], was refluxed for 3 hours, during which time evolution of acidic gases (HCl) was observed. The resultant suspension was allowed to cool to room temperature, the volume was reduced to about 10 ml by evaporation under a vacuum at room temperature, after which hexane (20 ml) was added. The dark red-coloured solid formed was recovered by way of filtration, washed with hexane (2×2 ml) and dried under a vacuum at room temperature, 826 mg (yield=75%) of a dark red-coloured solid product corresponding to the complex VCl$_2$(L3)(thf) being obtained.

Elemental analysis [found (calculated for C$_{12}$H$_{14}$Cl$_2$NOV)]: C: 45.98% (46.48%); H: 22.23% (22.87%); N: 4.05% (4.52%); V: 15.92% (16.43%); Cl: 22.80% (22.87%).

FT-IR (solid state, UATR, cm$^{-1}$): 1539; 1486; 1334.

Figure 12:
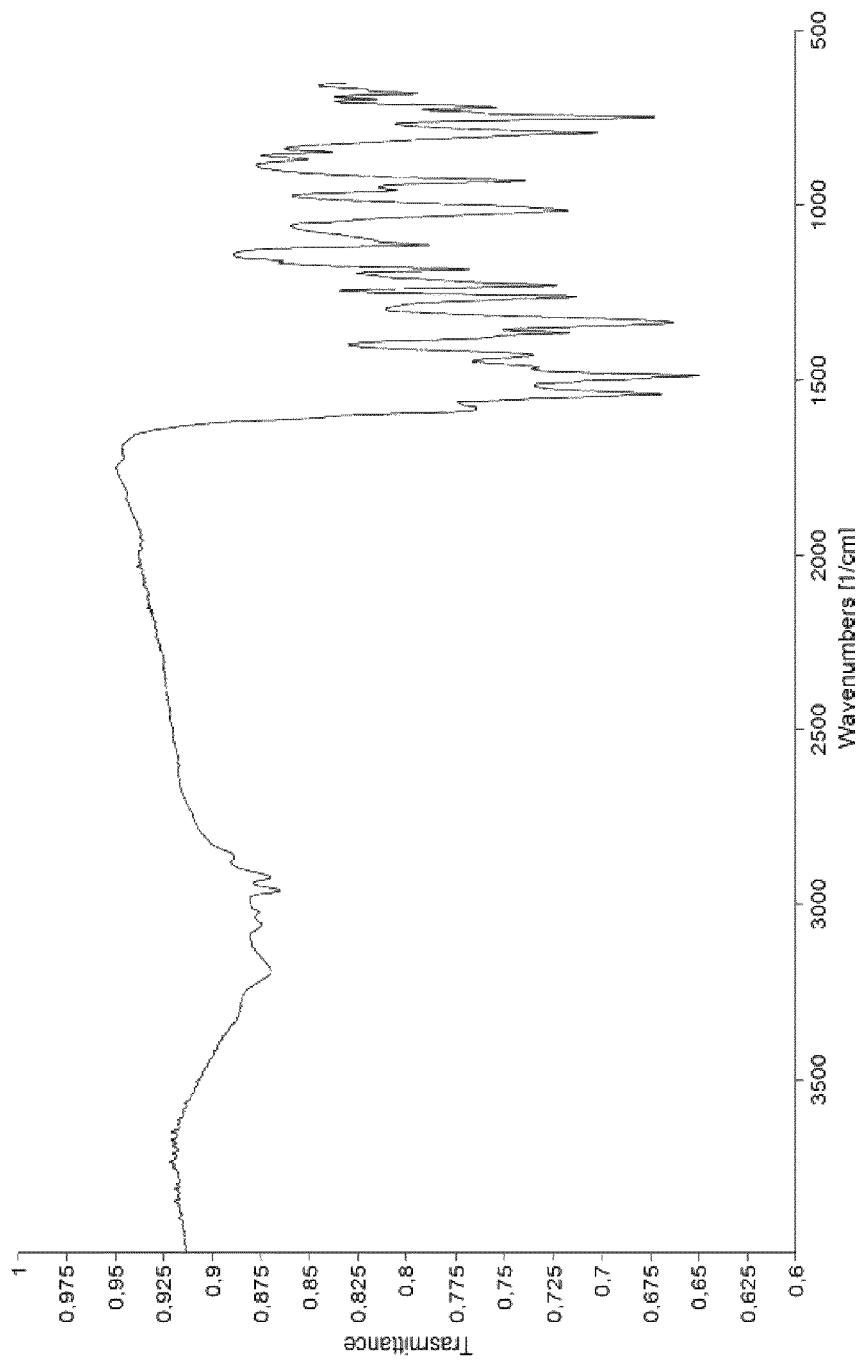

FIG. 12 shows the FT-IR spectrum (solid state, UATR) of the resultant complex VCl$_2$(L3).

Example 7 (MM430)

2 ml of 1,3-butadiene, equal to about 1.4 g, were condensed in the cold (−20° C.) in a 25 ml tube. 7.8 ml of toluene were then added and the temperature of the resultant solution was adjusted to 20° C. Dry methylaluminoxane (dry MAO) in a solution in toluene (6.3 ml; 1.0×10$^{-2}$ moles, equal to about 0.58 g) was then added, followed by the complex VCl$_2$(L1)(thf) (sample GT-298) (1.84 ml of suspension in toluene at a concentration of 2 mg/ml; 1×10$^{-5}$ moles, equal to about 3.68 mg) obtained as described in Example 4. The whole was stirred with a magnetic stirrer at 20° C. for 95 minutes. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.852 g of polybutadiene having a mixed cis/trans/1,2 structure and a 1,4-trans and 1,4-cis unit content of 72.5%: further characteristics of the process and of the resultant polybutadiene are shown in Table 1.

Figure 13:
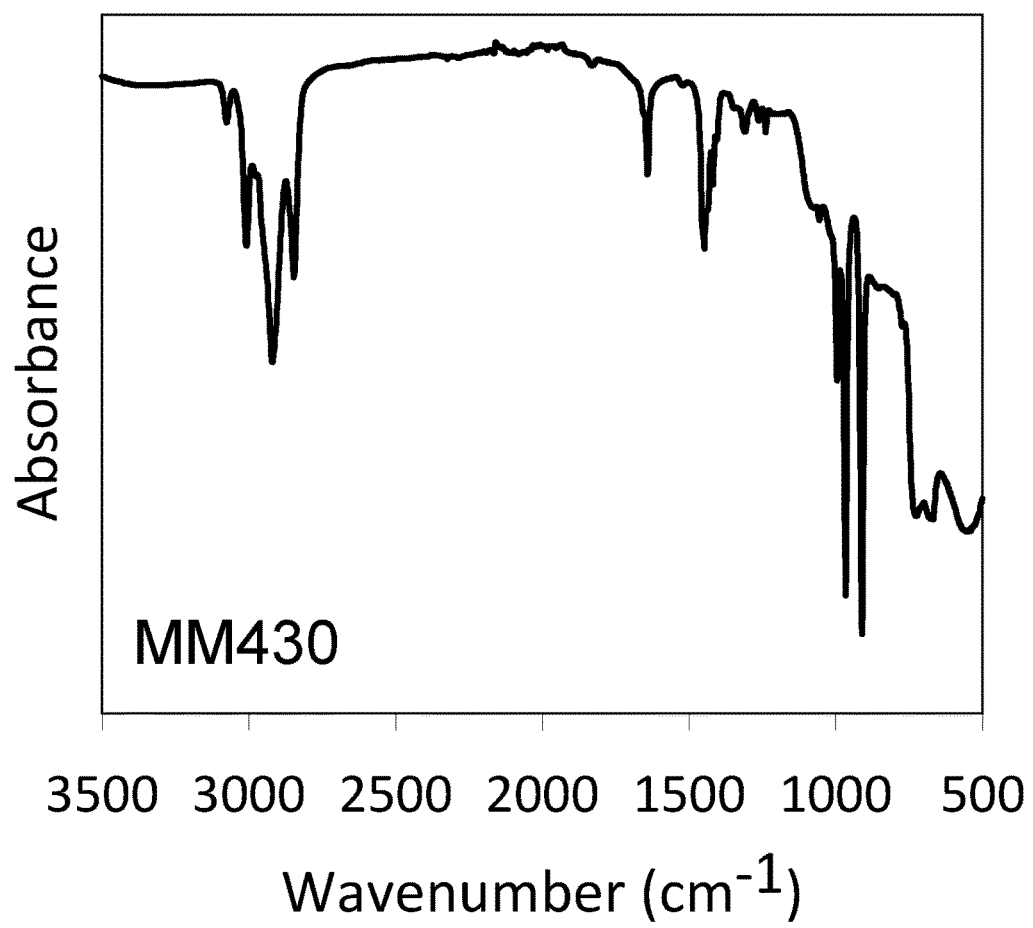

FIG. 13 shows the FT-IR spectrum of the resultant polybutadiene.

Example 8 (G1304)

2 ml of 1,3-butadiene, equal to about 1.4 g, were condensed in the cold (−20° C.) in a 25 ml tube. 7.8 ml of toluene were then added and the temperature of the resultant solution was adjusted to 20° C. Methylaluminoxane (MAO) in a solution in toluene (6.3 ml; 1.0×10$^{-2}$ moles, equal to about 0.58 g) was then added, followed by the complex VCl$_2$(L1)(thf) (sample GT-298) (1.84 ml of suspension in toluene at a concentration of 2 mg/ml; 1×10$^{-5}$ moles, equal to about 3.68 mg) obtained as described in Example 4. The whole was stirred with a magnetic stirrer at 20° C. for 20 hours. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), 0.427 g of polybutadiene having a mixed cis/trans/1,2 structure and a 1,4-trans and 1,4-cis unit content of 89.4% being obtained: further characteristics of the process and of the resultant polybutadiene are shown in Table 1.

Figure 14:
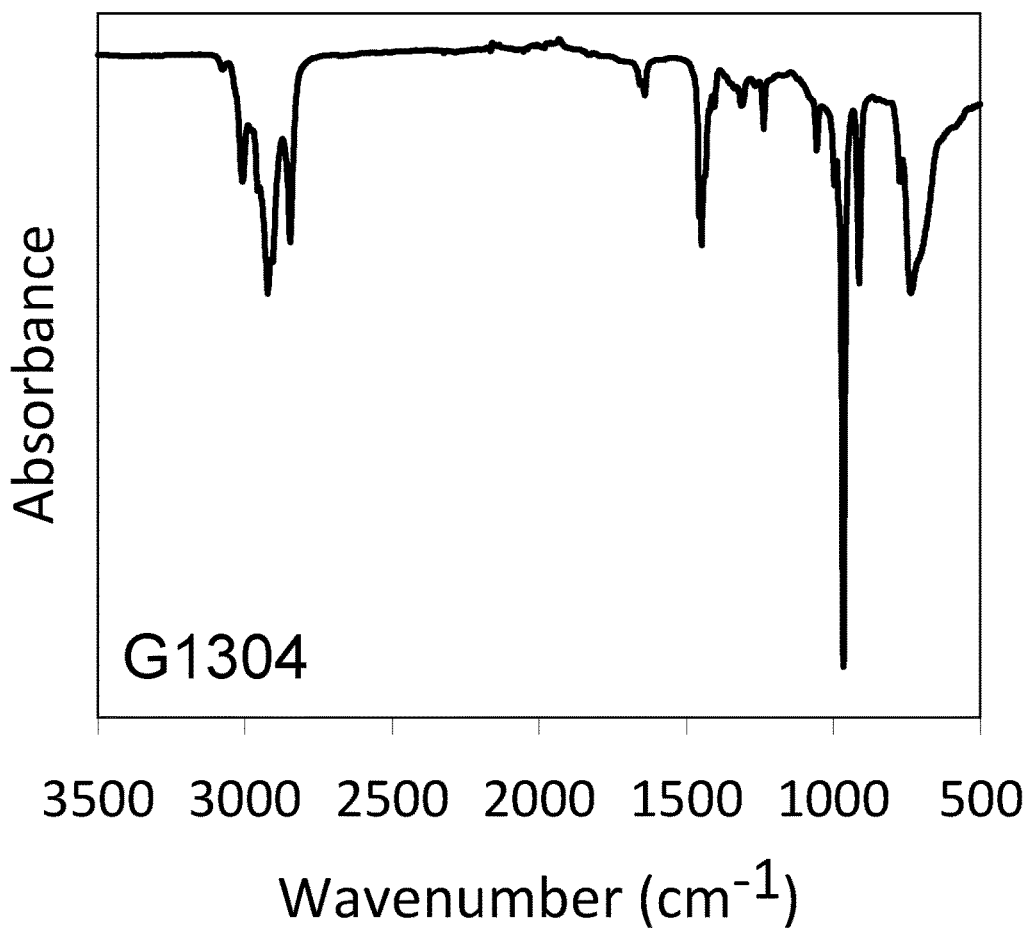

FIG. 14 shows the FT-IR spectrum of the resultant polybutadiene.

Example 9 (MM433)

2 ml of 1,3-butadiene, equal to about 1.4 g, were condensed in the cold (−20° C.) in a 25 ml tube. 7.8 ml of 1,2-dichlorobenzene were then added and the temperature of the resultant solution was adjusted to 20° C. Dry methylaluminoxane (dry MAO) in a solution in 1,2-dichlorobenzene (6.3 ml; 1.0×10$^{-2}$ moles, equal to about 0.58 g) was then added, followed by the complex VCl$_2$(L1)(thf) (sample GT-298) (1.84 ml of suspension in 1,2-dichlorobenzene at a concentration of 2 mg/ml; 1×10$^{-5}$ moles, equal to about 3.68 mg) obtained as described in Example 4. The whole was stirred with a magnetic stirrer at 20° C. for 95 minutes. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.739 g of polybutadiene having a mixed cis/trans/1,2 structure and a 1,4-trans and 1,4-cis unit content of 78.7%: further characteristics of the process and of the resultant polybutadiene are shown in Table 1.

Figure 15:
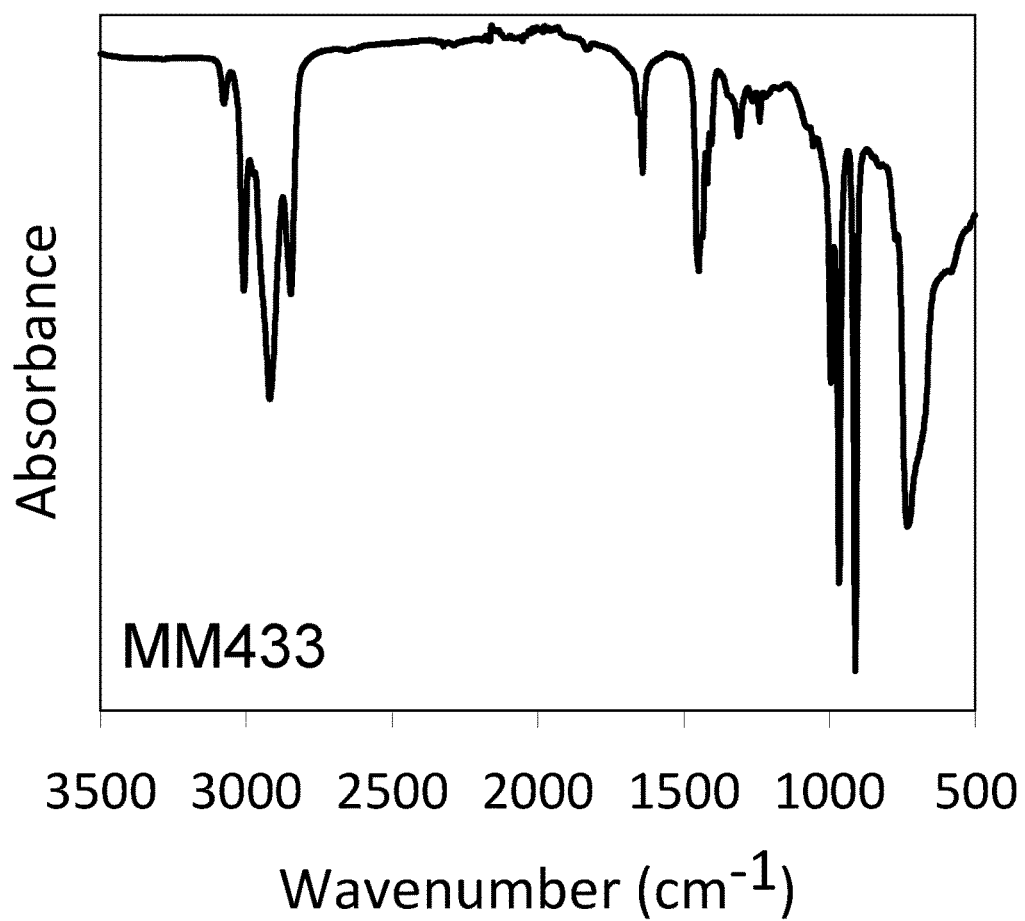

FIG. 15 shows the FT-IR spectrum of the resultant polybutadiene.

Example 10 (MM316)

2 ml of 1,3-butadiene, equal to about 1.4 g, were condensed in the cold (−20° C.) in a 25 ml tube. 7.6 ml of toluene were then added and the temperature of the resultant solution was adjusted to 20° C. Dry methylaluminoxane (dry MAO) in a solution in toluene (6.3 ml; 1.0×10$^{-2}$ moles, equal to about 0.58 g) was then added, followed by the complex VCl$_2$(L2) (sample GT-301) (2.1 ml of suspension in toluene at a concentration of 2 mg/ml; 1×10$^{-5}$ moles, equal to about 4.2 mg) obtained as described in Example 5. The whole was stirred with a magnetic stirrer at 20° C. for 60 minutes. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.988 g of polybutadiene having a mixed cis/trans/1,2 structure and a 1,4-trans and 1,4-cis unit content of 81.0%: further characteristics of the process and of the resultant polybutadiene are shown in Table 1.

Figure 16:
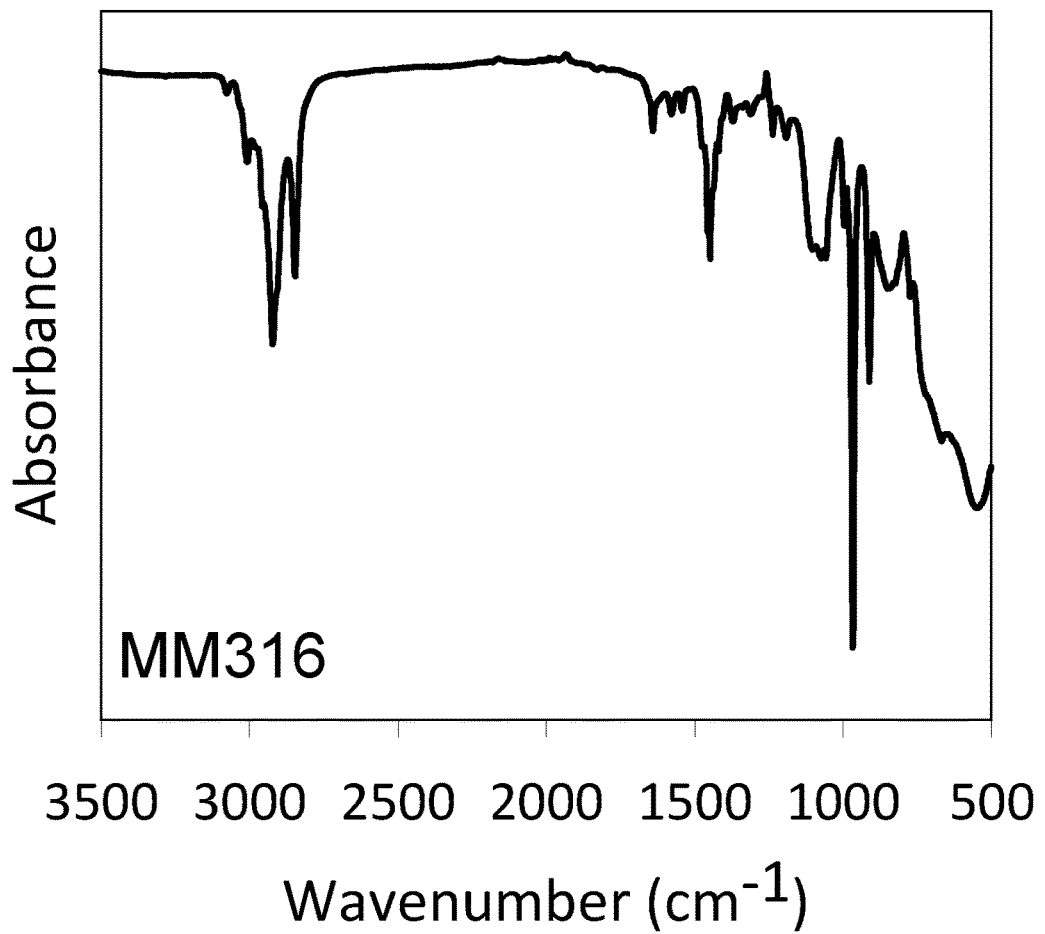

FIG. 16 shows the FT-IR spectrum of the resultant polybutadiene.

Example 11 (G1305)

2 ml of 1,3-butadiene, equal to about 1.4 g, were condensed in the cold (−20° C.) in a 25 ml tube. 7.6 ml of toluene were then added and the temperature of the resultant solution was adjusted to 20° C. Methylaluminoxane (MAO) in a solution in toluene (6.3 ml; 1.0×10$^{-2}$ moles, equal to about 0.58 g) was then added, followed by the complex VCl$_2$(L2) (sample GT-301) (2.1 ml of suspension in toluene at a concentration of 2 mg/ml; 1×10$^{-5}$ moles, equal to about 4.2 mg) obtained as described in Example 5. The whole was stirred with a magnetic stirrer at 20° C. for 10 minutes. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.986 g of polybutadiene having a predominantly 1,4-trans structure and a 1,4-trans unit content of 97.0%: further characteristics of the process and of the resultant polybutadiene are shown in Table 1.

Figure 17:
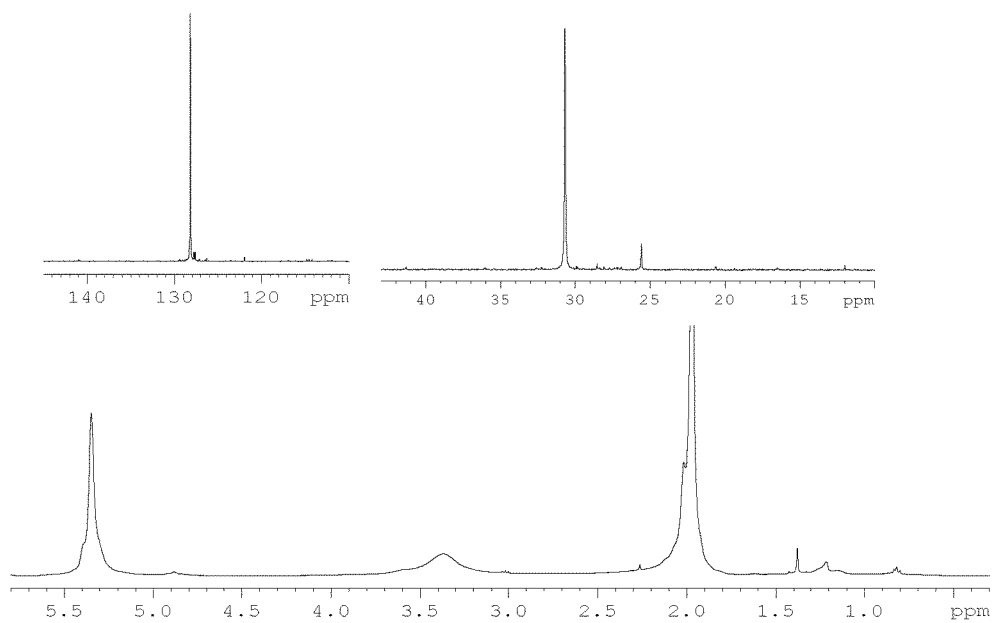

FIG. 17 shows the $^1$H-NMR and $^{13}$C-NMR spectra of the resultant polybutadiene.

Example 12 (MM418)

2 ml of 1,3-butadiene, equal to about 1.4 g, were condensed in the cold (−20° C.) in a 25 ml tube. 8.15 ml of toluene were then added and the temperature of the resultant solution was adjusted to 20° C. Dry methylaluminoxane (dry MAO) in a solution in toluene (6.3 ml; $1.0 \times 10^{-2}$ moles, equal to about 0.58 g) was then added, followed by the complex $VCl_2(L3)(thf)$ (sample GT-363) (1.55 ml of suspension in toluene at a concentration of 2 mg/ml; $1 \times 10^{-5}$ moles, equal to about 3.1 mg) obtained as described in Example 6. The whole was stirred with a magnetic stirrer at 20° C. for 150 minutes. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.212 g of polybutadiene having a mixed cis/trans/1,2 structure and a 1,4-trans and 1,4-cis unit content of 79.0%: further characteristics of the process and of the resultant polybutadiene are shown in Table 1.

Figure 18:
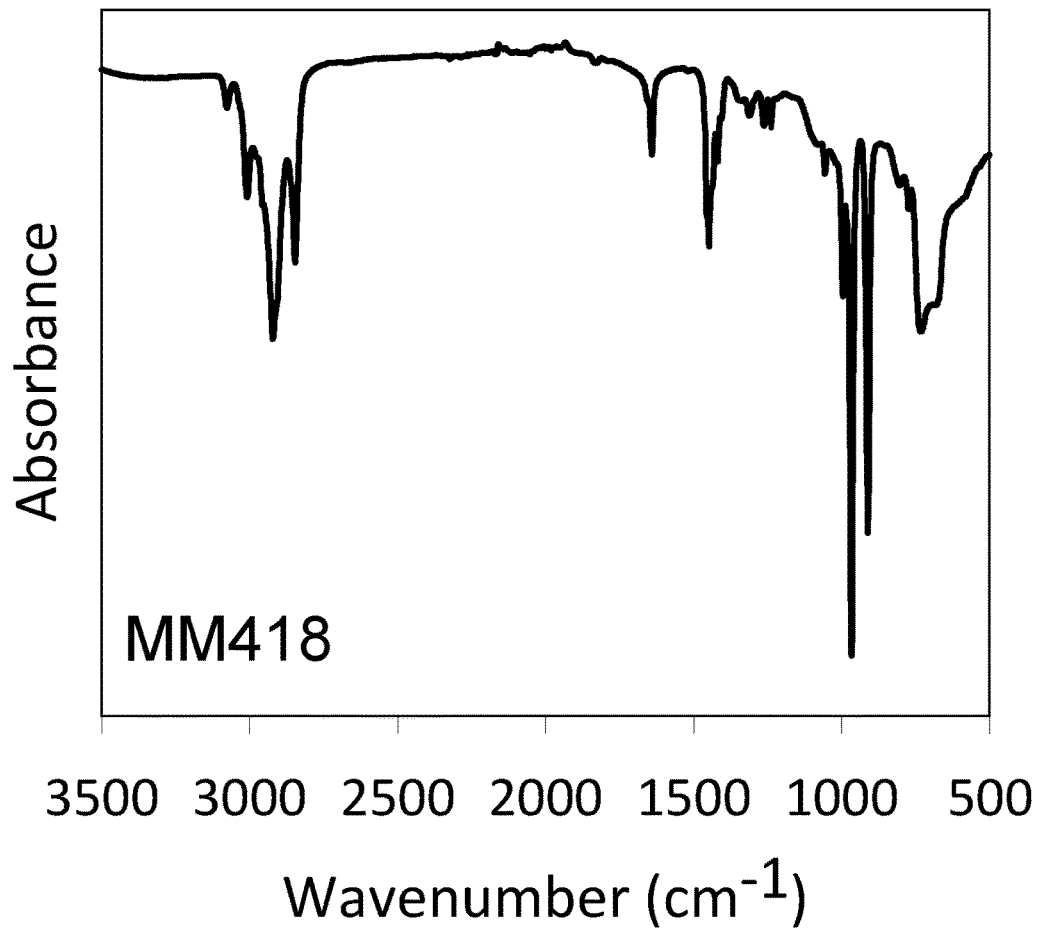

FIG. 18 shows the FT-IR spectrum of the resultant polybutadiene.

Example 13 (MM417)

2 ml of 1,3-butadiene, equal to about 1.4 g, were condensed in the cold (−20° C.) in a 25 ml tube. 8.15 ml of toluene were then added and the temperature of the resultant solution was adjusted to 20° C. Methylaluminoxane (MAO) in a solution in toluene (6.3 ml; $1.0 \times 10^{-2}$ moles, equal to about 0.58 g) was then added, followed by the complex $VCl_2(L3)(thf)$ (sample GT-363) (1.55 ml of suspension in toluene at a concentration of 2 mg/ml; $1 \times 10^{-5}$ moles, equal to about 3.1 mg) obtained as described in Example 6. The whole was stirred with a magnetic stirrer at 20° C. for 72 hours. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.291 g of polybutadiene having a mixed cis/trans/1,2 structure and a 1,4-trans and 1,4-cis unit content of 89.1%: further characteristics of the process and of the resultant polybutadiene are shown in Table 1.

Figure 19:
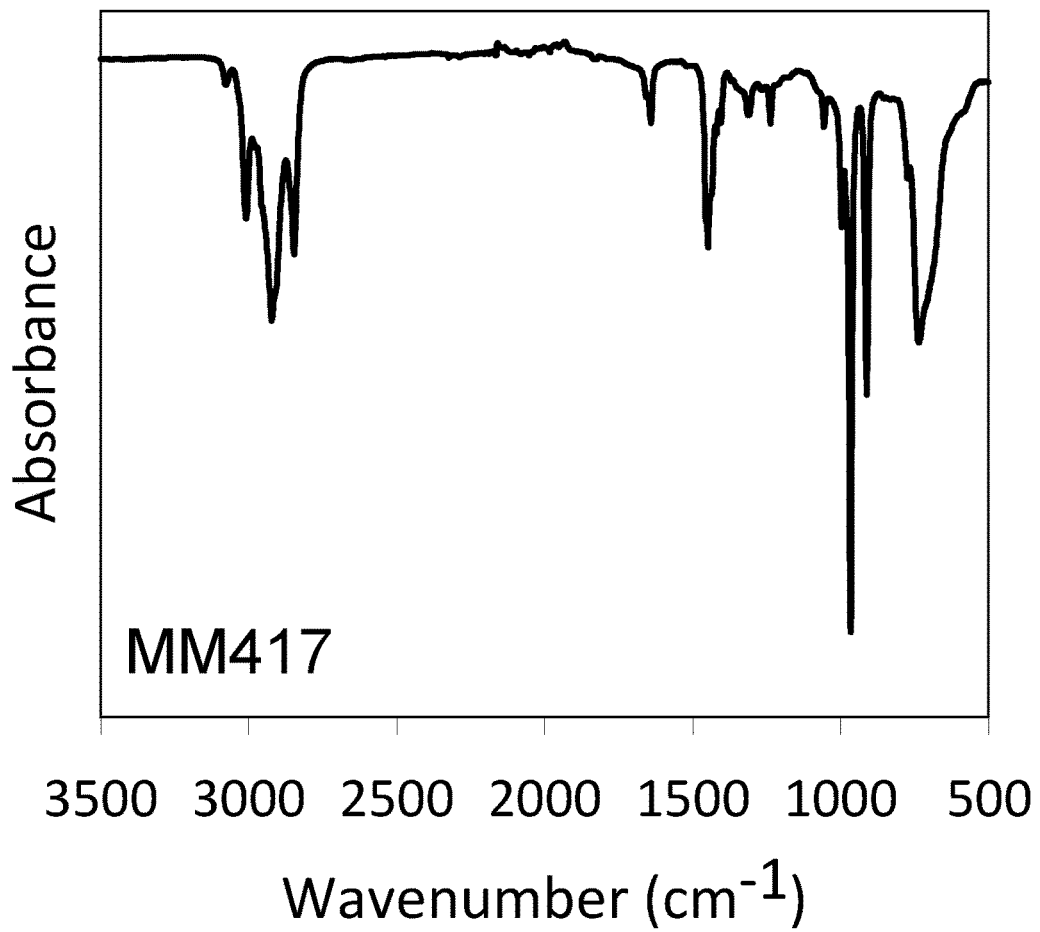

FIG. 19 shows the FT-IR spectrum of the resultant polybutadiene.

Example 14 (MM434)

2 ml of 1,3-butadiene, equal to about 1.4 g, were condensed in the cold (−20° C.) in a 25 ml tube. 8.15 ml of 1,2-dichlorobenzene were then added and the temperature of the resultant solution was adjusted to 20° C. Dry methylaluminoxane (dry MAO) in a solution in 1,2-dichlorobenzene (6.3 ml; $1.0 \times 10^{-2}$ moles, equal to about 0.58 g) was then added, followed by the complex $VCl_2(L3)(thf)$ (sample GT-363) (1.55 ml of suspension in 1,2-dichlorobenzene at a concentration of 2 mg/ml; $1 \times 10^{-5}$ moles, equal to about 3.1 mg) obtained as described in Example 6. The whole was stirred with a magnetic stirrer at 20° C. for 95 minutes. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.340 g of polybutadiene having a mixed cis/trans/1,2 structure and a 1,4-trans and 1,4-cis unit content of 73.2%: further characteristics of the process and of the resultant polybutadiene are shown in Table 1.

Figure 20:
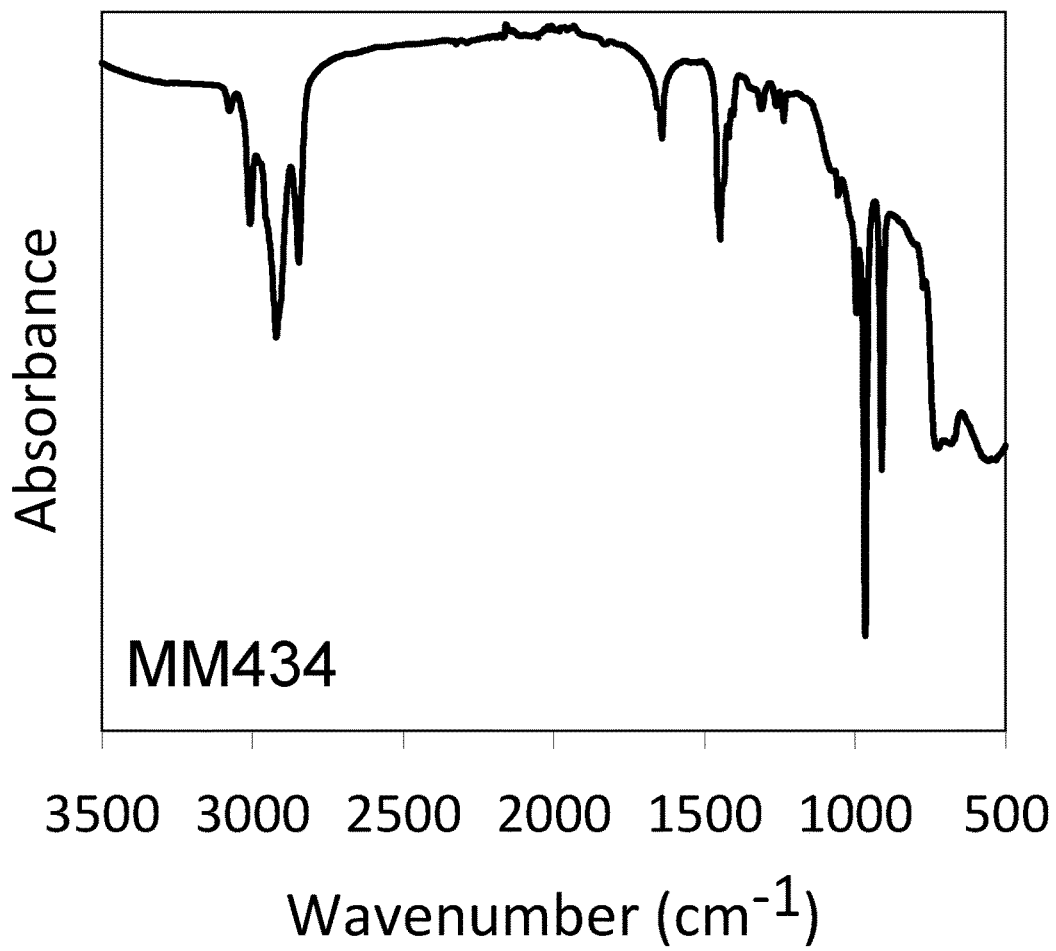

FIG. 20 shows the FT-IR spectrum of the resultant polybutadiene.

Example 15 (G1316)

2 ml of isoprene equal to about 1.36 g were introduced into a 25 ml tube. 7.8 ml of toluene were then added and the temperature of the resultant solution was adjusted to 20° C. Methylaluminoxane (MAO) in a solution in toluene (6.3 ml; $1 \times 10^{-2}$ moles, equal to about 0.58 g) was then added, followed by the complex $VCl_2(L1)(thf)$ (sample GT-298) (1.84 ml of suspension in toluene ata concentration of 2 mg/ml; $1 \times 10^{-5}$ moles, equal to about 3.68 mg) obtained as described in Example 4. The whole was stirred with a magnetic stirrer at 20° C. for 24 hours. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.438 g of polyisoprene having a predominantly 1,4-cis structure and a 1,4-cis unit content of 91.3%: further characteristics of the process and of the resultant polyisoprene are shown in Table 2.

Figure 21:
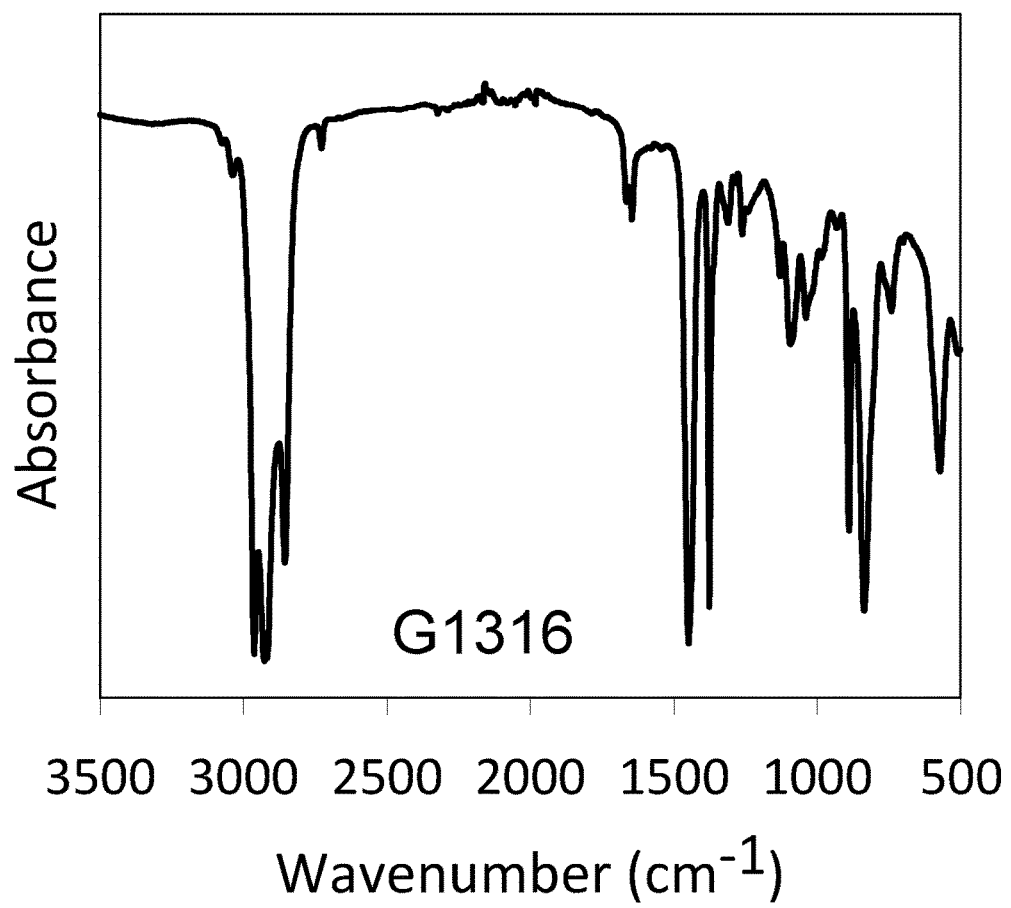

FIG. 21 shows the FT-IR spectrum of the resultant polyisoprene.

Figure 22:
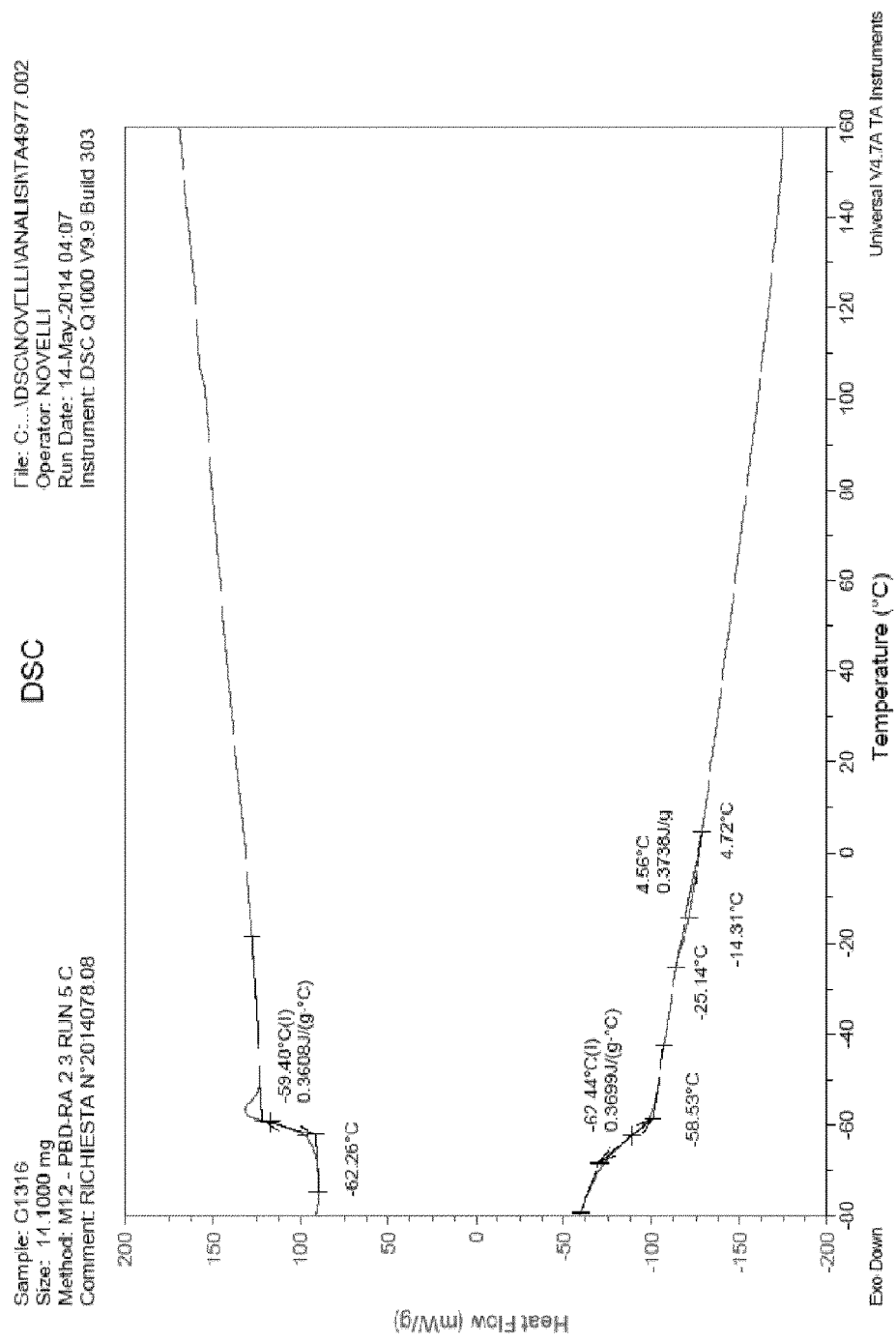

FIG. 22 shows the DSC diagram of the resultant polyisoprene.

Figure 23:
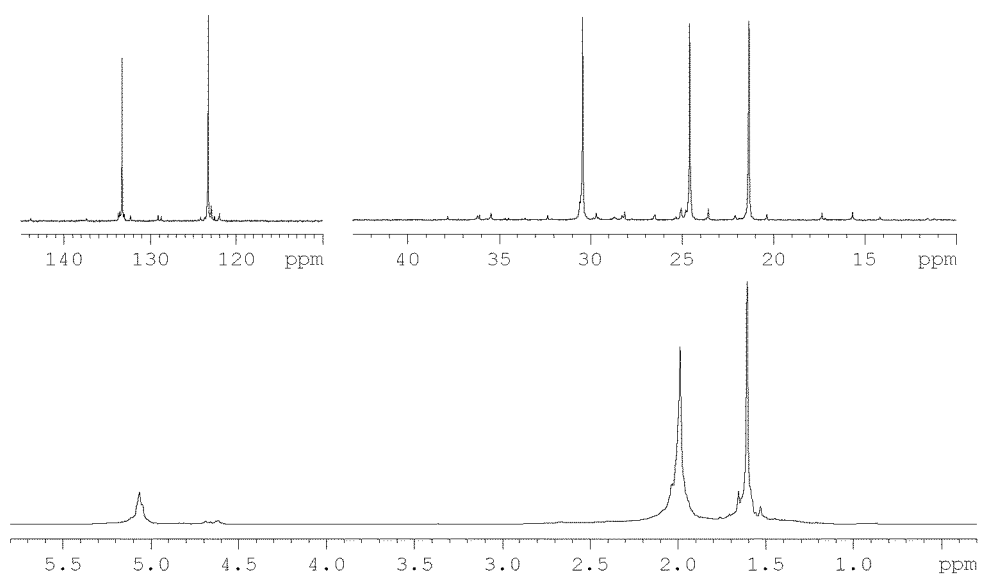

FIG. 23 shows the $^1$H-NMR and $^{13}$C-NMR spectra of the resultant polyisoprene.

Example 16 (MM333)

2 ml of isoprene equal to about 1.36 g were introduced into a 25 ml tube. 7.8 ml of toluene were then added and the temperature of the resultant solution was adjusted to 20° C. Dry methylaluminoxane (dry MAO) in a solution in toluene (6.3 ml; $1 \times 10^{-2}$ moles, equal to about 0.58 g) was then added, followed by the complex $VCl_2(L1)(thf)$ (sample GT-298) (1.84 ml of suspension in toluene at a concentration of 2 mg/ml; $1 \times 10^{-5}$ moles, equal to about 3.68 mg) obtained as described in Example 4. The whole was stirred with a magnetic stirrer at 20° C. for 60 minutes. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.565 g of polyisoprene having a mixed cis/trans/3,4 structure and a 1,4-trans and 1,4-cis unit content of 83.3%: further characteristics of the process and of the resultant polyisoprene are shown in Table 2.

Figure 24:
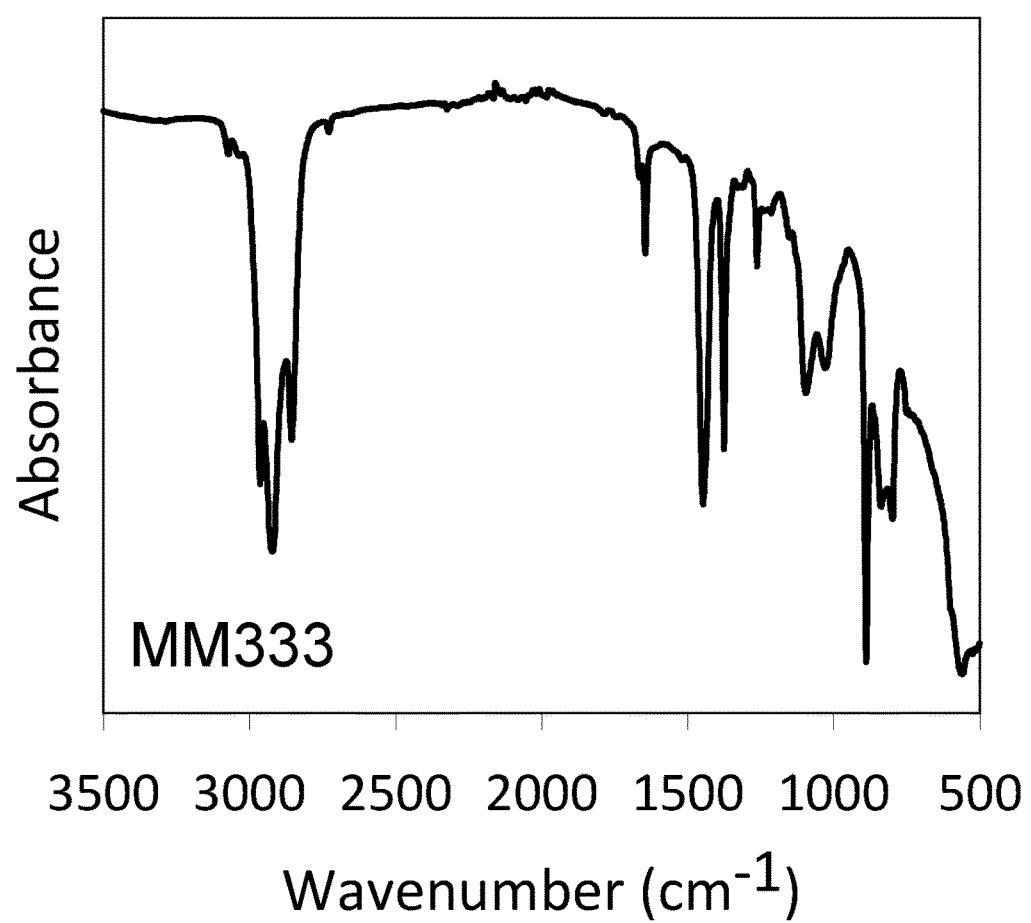

FIG. 24 shows the FT-IR spectrum of the resultant polyisoprene.

Figure 25:
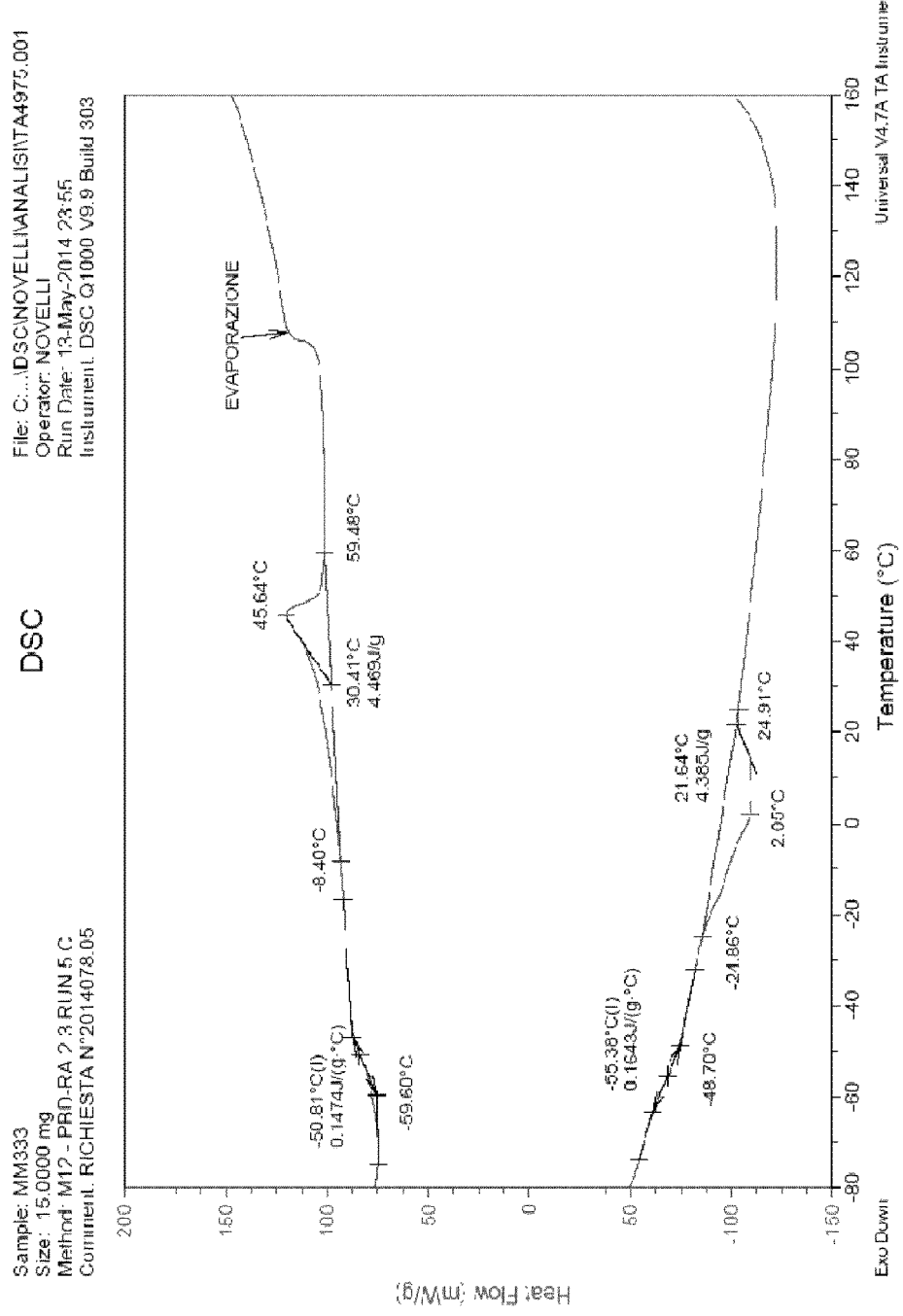

FIG. 25 shows the DSC diagram of the resultant polyisoprene.

Figure 26:
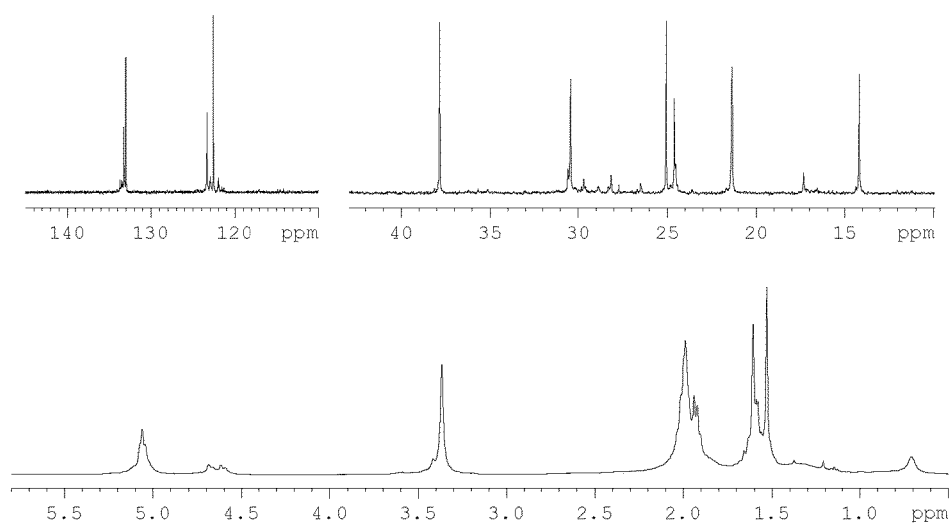

FIG. 26 shows the $^1$H-NMR and $^{13}$C-NMR spectra of the resultant polyisoprene.

Example 17 (G1315)

2 ml of isoprene equal to about 1.36 g were introduced into a 25 ml tube. 7.6 ml of toluene were then added and the temperature of the resultant solution was adjusted to 20° C. Methylaluminoxane (MAO) in a solution in toluene (6.3 ml; $1 \times 10^{-2}$ moles, equal to about 0.58 g) was then added, followed by the complex VCl$_2$(L2) (sample GT-301) (2.1 ml of suspension in toluene at a concentration of 2 mg/ml; $1 \times 10^{-5}$ moles, equal to about 4.2 mg) obtained as described in Example 5. The whole was stirred with a magnetic stirrer at 20° C. for 24 hours. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.340 g of polyisoprene having a predominantly 1,4-cis structure and a 1,4-cis unit content of 90.9%: further characteristics of the process and of the resultant polyisoprene are shown in Table 2.

Figure 27:
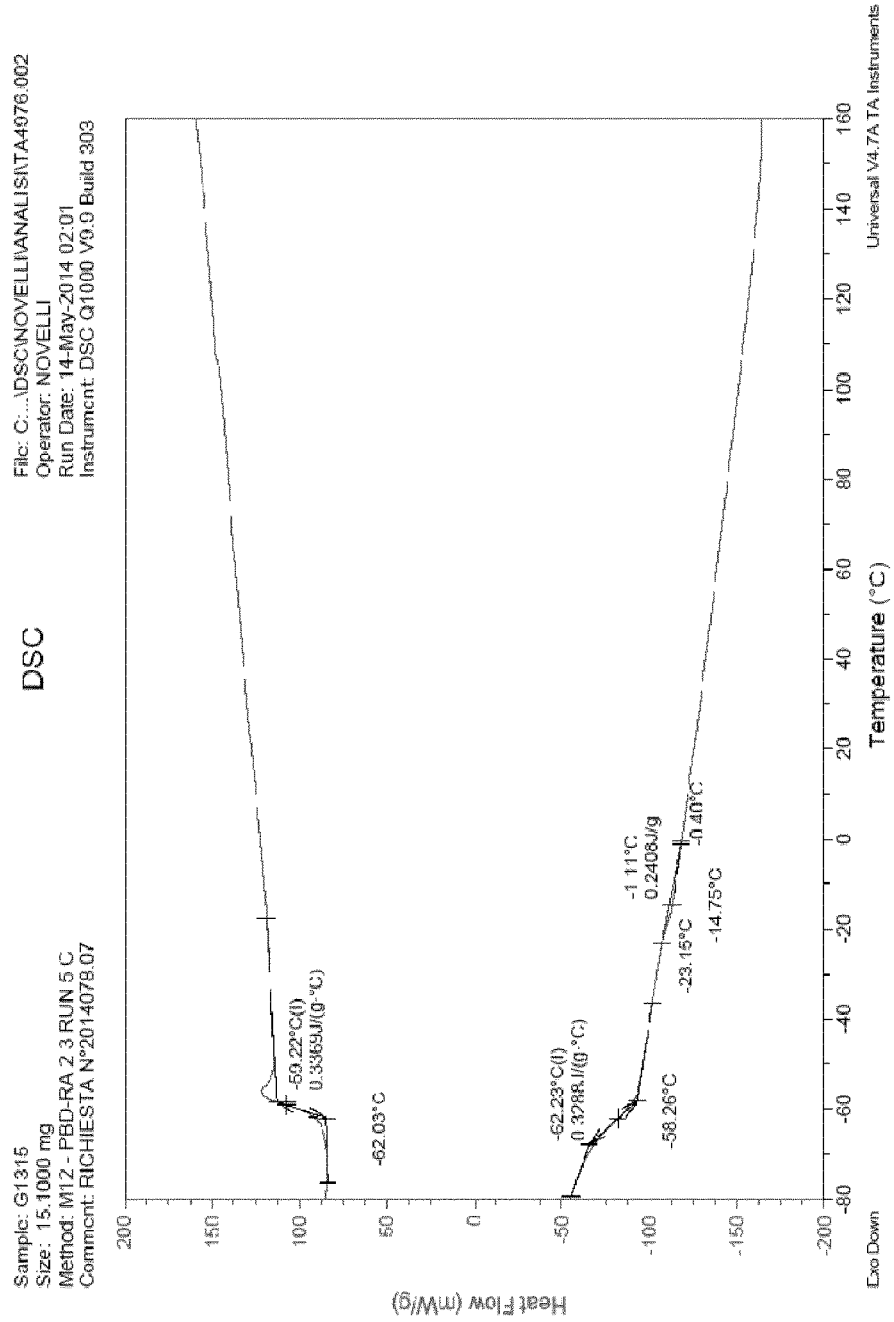

FIG. 27 shows the DSC diagram of the resultant polyisoprene.

Figure 28:
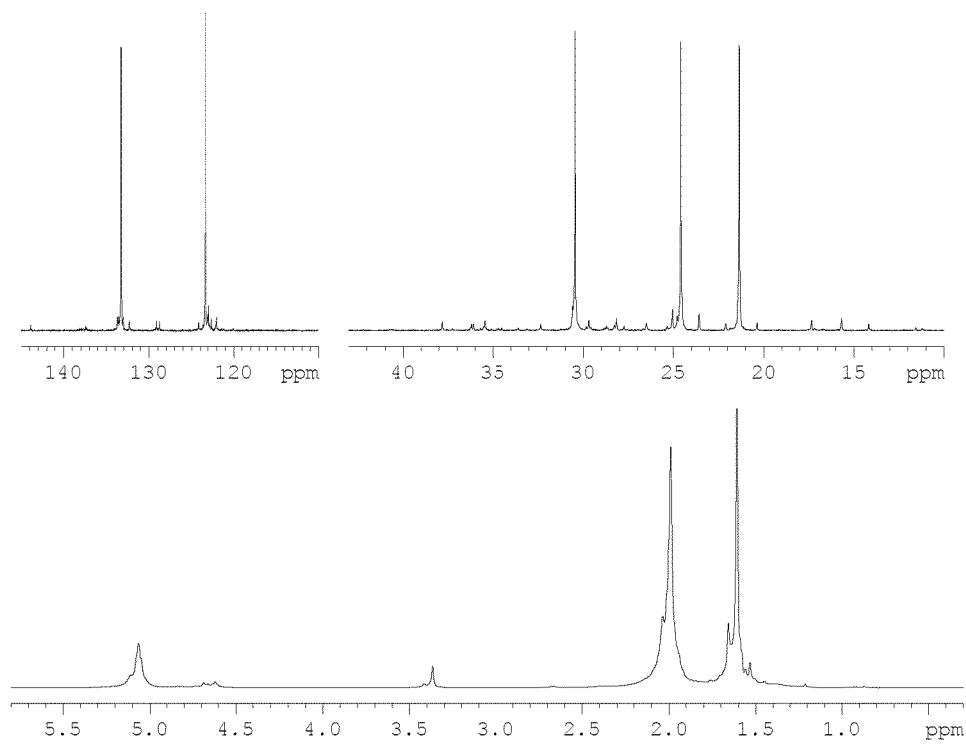

FIG. 28 shows the $^1$H-NMR and $^{13}$C-NMR spectra of the resultant polyisoprene.

Example 18 (G1318)

2 ml of isoprene equal to about 1.36 g were introduced into a 25 ml tube. 7.6 ml of toluene were then added and the temperature of the resultant solution was adjusted to 20° C. Dry methylaluminoxane (dry MAO) in a solution in toluene (6.3 ml; $1 \times 10^{-2}$ moles, equal to about 0.58 g) was then added, followed by the complex VCl$_2$(L2) (sample GT-301) (2.1 ml of suspension in toluene at a concentration of 2 mg/ml; $1 \times 10^{-5}$ moles, equal to about 4.2 mg) obtained as described in Example 5. The whole was stirred with a magnetic stirrer at 20° C. for 60 minutes. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.225 g of polyisoprene having a mixed cis/trans/3,4 structure and a 1,4-trans and 1,4-cis unit content of 84.3%: further characteristics of the process and of the resultant polyisoprene are shown in Table 2.

Figure 29:
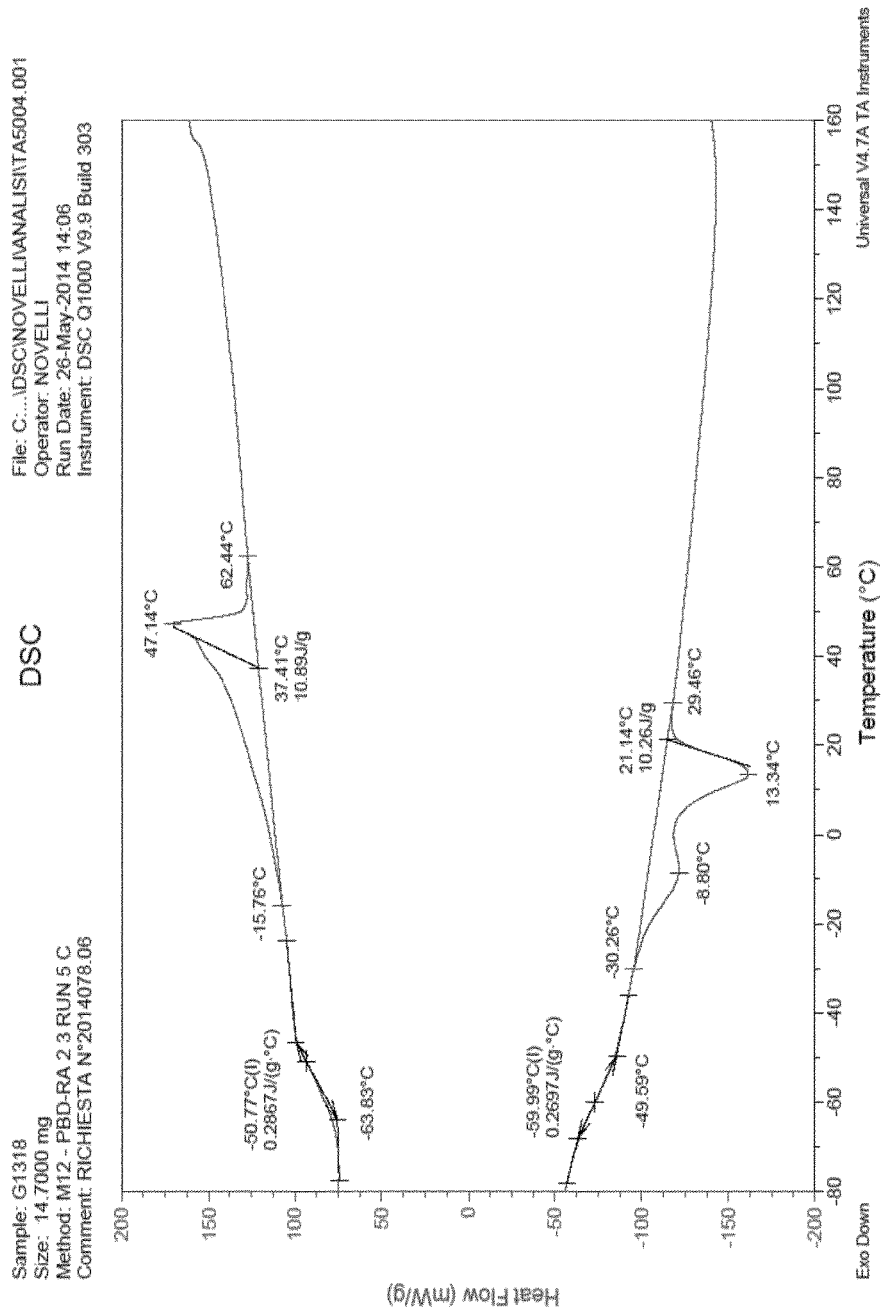

FIG. 29 shows the DSC diagram of the resultant polyisoprene.

Figure 30:
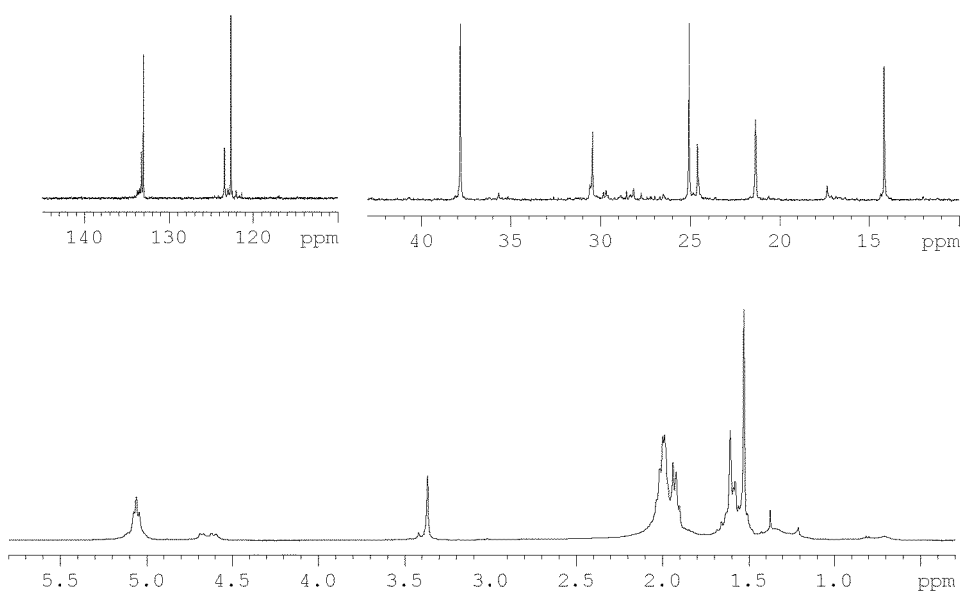

FIG. 30 shows the $^1$H-NMR and $^{13}$C-NMR spectra of the resultant polyisoprene.

Example 19 (MM427)

2 ml of isoprene equal to about 1.36 g were introduced into a 25 ml tube. 8.15 ml of toluene were then added and the temperature of the resultant solution was adjusted to 20° C. Methylaluminoxane (MAO) in a solution in toluene (6.3 ml; $1 \times 10^{-2}$ moles, equal to about 0.58 g) was then added, followed by the complex VCl$_2$(L3)(thf) (sample GT-363) (1.55 ml of suspension in toluene at a concentration of 2 mg/ml; $1 \times 10^{-5}$ moles, equal to about 3.1 mg) obtained as described in Example 6. The whole was stirred with a magnetic stirrer at 20° C. for 21 hours. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.239 g of polyisoprene having a predominantly 1,4-cis structure and a 1,4-cis unit content of 86.2%: further characteristics of the process and of the resultant polyisoprene are shown in Table 2.

Figure 31:
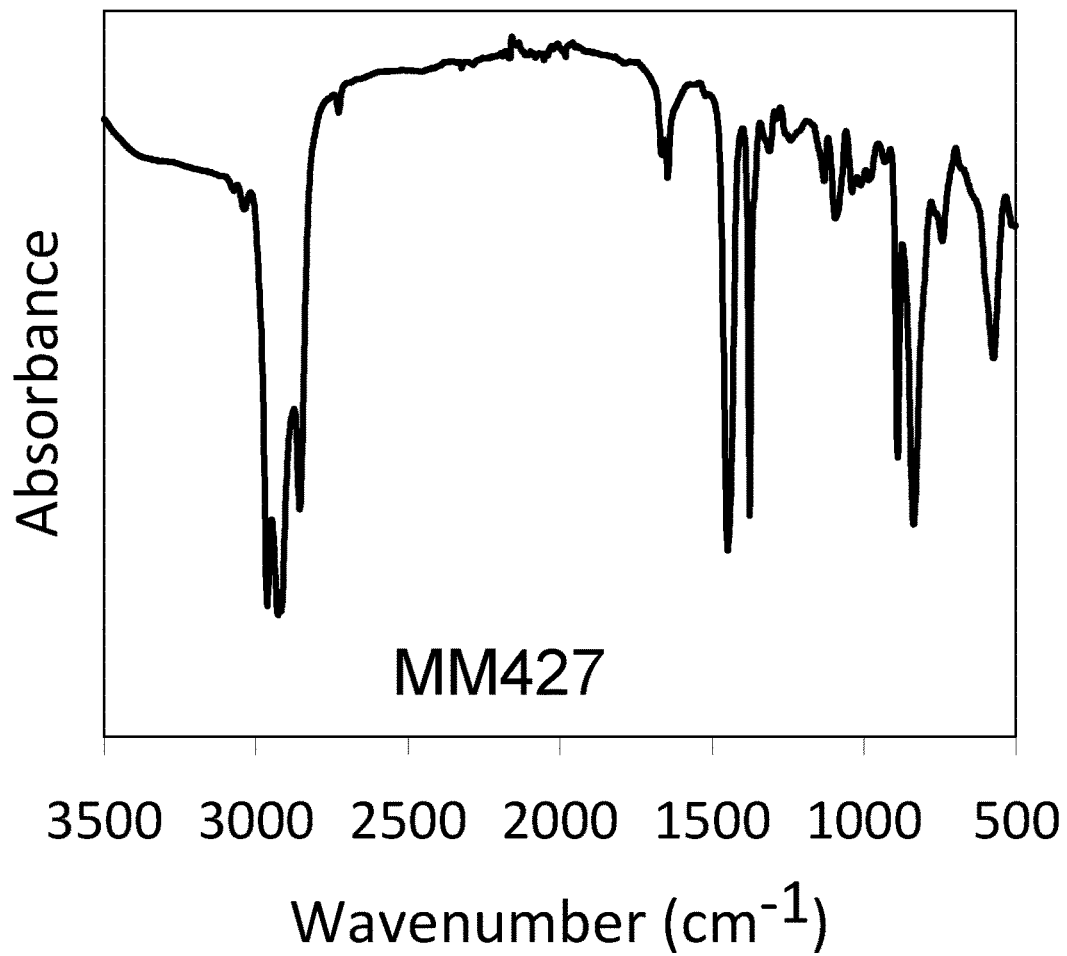

FIG. 31 shows the FT-IR spectrum of the resultant polyisoprene.

Example 20 (MM428)

2 ml of isoprene equal to about 1.36 g were introduced into a 25 ml tube. 8.15 ml of toluene were then added and the temperature of the resultant solution was adjusted to 20° C. Dry methylaluminoxane (dry MAO) in a solution in toluene (6.3 ml; $1 \times 10^{-2}$ moles, equal to about 0.58 g) was then added, followed by the complex VCl$_2$(L3)(thf) (sample GT-363) (1.55 ml of suspension in toluene at a concentration of 2 mg/ml; $1 \times 10^{-5}$ moles, equal to about 3.1 mg) obtained as described in Example 6. The whole was stirred with a magnetic stirrer at 20° C. for 21 hours. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.271 g of polyisoprene having a mixed cis/trans/3,4 structure and a 1,4-trans and 1,4-cis unit content of 81.5%: further characteristics of the process and of the resultant polyisoprene are shown in Table 2.

Figure 32:
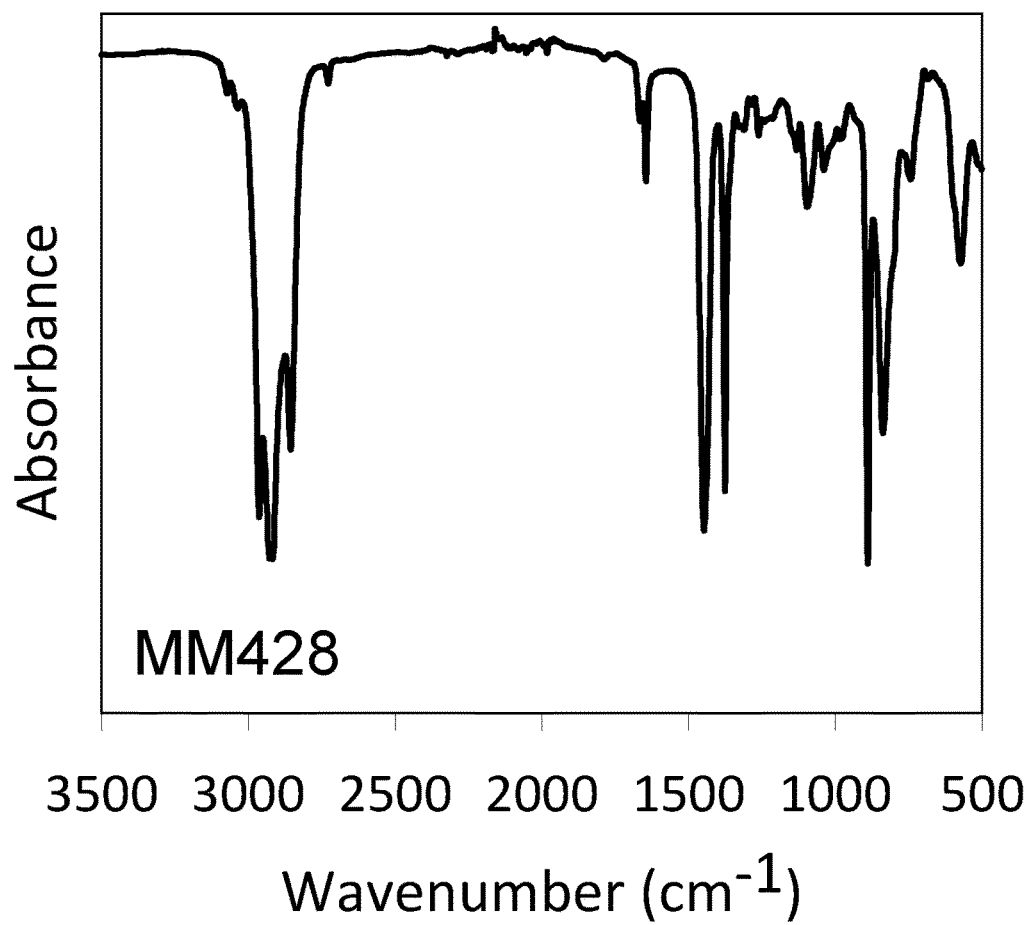

FIG. 32 shows the FT-IR spectrum of the resultant polyisoprene.

Example 21 (MM429)

2 ml of isoprene equal to about 1.36 g were introduced into a 25 ml tube. 8.15 ml of toluene were then added and the temperature of the resultant solution was adjusted to 20° C. Dry methylaluminoxane (dry MAO) in a solution in 1,2-dichlorobenzene (6.3 ml; $1 \times 10^{-2}$ moles, equal to about 0.58 g) was then added, followed by the complex VCl$_2$(L3)(thf) (sample GT-363) (1.55 ml of suspension in 1,2-dichlorobenzene at a concentration of 2 mg/ml; $1 \times 10^{-5}$ moles, equal to about 3.1 mg) obtained as described in Example 6. The whole was stirred with a magnetic stirrer at 20° C. for 20 hours. The polymerisation was then quenched by adding 2 ml of methanol containing a few drops of hydrochloric acid. The resultant polymer was then coagulated by adding 40 ml of a methanolic solution containing 4% of Irganox® 1076 antioxidant (Ciba), there being obtained 0.813 g of polyisoprene having a mixed cis/trans/3,4 structure and a 1,4-trans and 1,4-cis unit content of 85.0%: further characteristics of the process and of the resultant polyisoprene are shown in Table 2.

Figure 33:
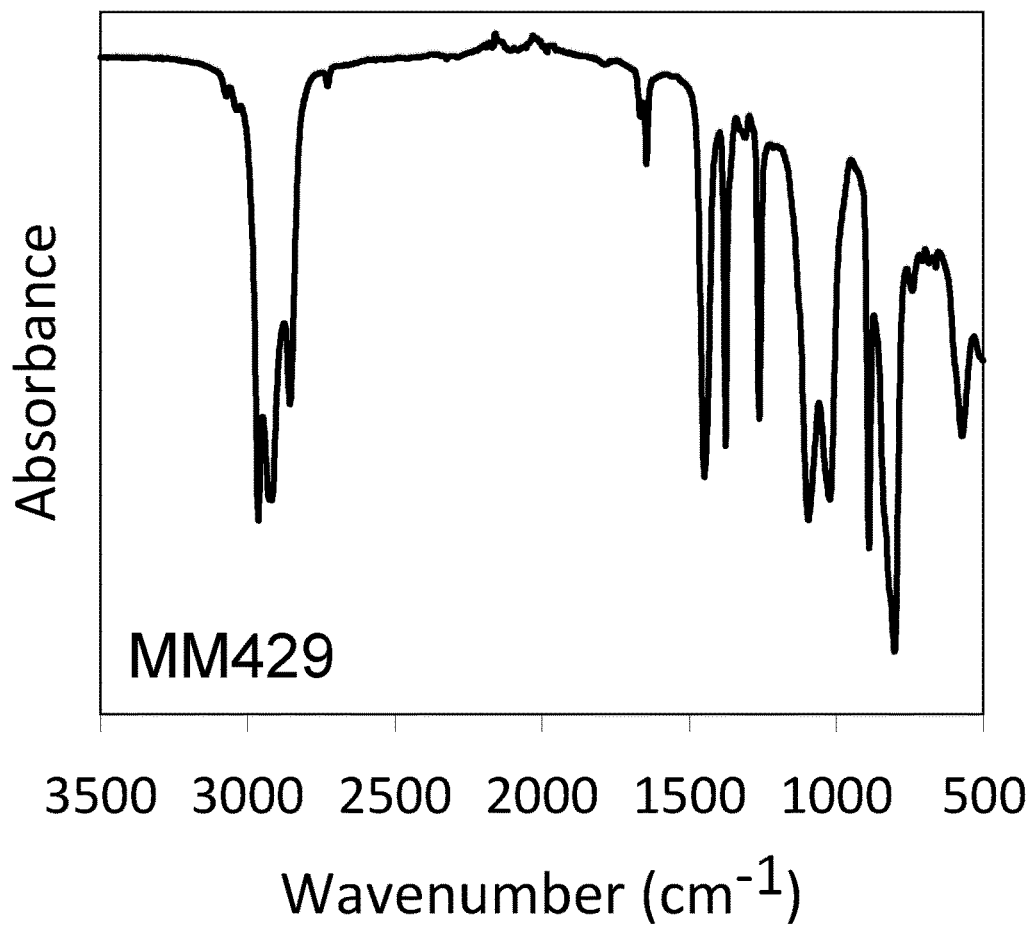

FIG. 33 shows the FT-IR spectrum of the resultant polyisoprene.

TABLE 1

Polymerisation of 1,3-butadiene with catalytic systems comprising oxo-nitrogenated vanadium complexes

| Example | Time (minutes) | Conversion (%) | 1,4-cis (%) | 1,4-trans (%) | 1.2 (%) | $M_w$ (g × mol$^{-1}$) | $M_w/M_n$ |
|---|---|---|---|---|---|---|---|
| 7 | 95 | 60.9 | 46.1 | 26.4 | 27.4 | 302950 | 2.2 |
| 8 | 1200 | 30.5 | 51.8 | 37.6 | 10.6 | 326603 | 1.9 |
| 9[a] | 95 | 52.9 | 61.8 | 16.9 | 21.3 | 298700 | 2.0 |
| 10 | 60 | 70.6 | 23.5 | 57.5 | 18.2 | 269800 | 1.9 |
| 11 | 10 | 70.4 | 0 | 97 | 3 | 954730 | 1.6 |
| 12 | 150 | 15.1 | 43.2 | 35.8 | 21.0 | 315400 | 2.0 |
| 13 | 4320 | 20.8 | 68.8 | 20.3 | 10.9 | 395600 | 1.8 |
| 14[a] | 95 | 24.3 | 37.2 | 36.0 | 26.8 | 287800 | 2.1 |

[a]polymerisation solvent 1,2-dichlorobenzene.

TABLE 2

Polymerisation of isoprene with catalytic systems comprising oxo-nitrogenated vanadium complexes

| Example | Time (hours) | Conversion (%) | 1,4-cis (%) | 1,4-trans (%) | 3.4 (%) | $M_w$ (g × mol$^{-1}$) | $M_w/M_n$ |
|---|---|---|---|---|---|---|---|
| 15 | 24 | 32.2 | 91.3 | 0 | 8.7 | 122500 | 1.8 |
| 16 | 1 | 41.5 | 32.2 | 51.1 | 16.7 | 98700 | 1.9 |
| 17 | 24 | 25.0 | 90.9 | 0 | 9.1 | 151700 | 2.0 |
| 18 | 1 | 16.5 | 28.2 | 56.1 | 15.7 | 115600 | 1.9 |
| 19 | 21 | 17.6 | 86.2 | 0 | 13.8 | 134900 | 2.0 |
| 20 | 21 | 19.9 | 31.5 | 50.0 | 31.5 | 118750 | 1.9 |
| 21[a] | 20 | 59.8 | 36.7 | 48.3 | 15.0 | 135200 | 2.1 |

[a]polymerisation solvent 1,2-dichlorobenzene.

The invention claimed is:

1. An oxo-nitrogenated vanadium complex having general formula (I):

in which:
$R_1$, $R_2$, $R_3$, $R_4$, $R_5$, $R_6$ and $R_7$, mutually identical or different, represent a hydrogen atom; or are selected from an optionally halogenated, linear or branched $C_1$-$C_{20}$ alkyl group, an optionally substituted cycloalkyl group, and an optionally substituted aryl group,
$X_1$ and $X_2$, mutually identical or different, represent a halogen atom; or are selected from a linear or branched $C_1$-$C_{20}$ alkyl group, an —OCOR$_8$ group and or an —OR$_8$ group in which $R_8$ is selected from a linear or branched $C_1$-$C_{20}$ alkyl group;
Y is an ether; and
n is 0 or 1.

2. An oxo-nitrogenated vanadium complex having the general formula (I) according to claim 1, in which:
$R_1$, $R_2$, $R_3$, $R_4$, $R_5$, $R_6$ and $R_7$, mutually identical or different, represent a hydrogen atom; or are selected from a linear or branched $C_1$-$C_{20}$ alkyl group;
$X_1$ and $X_2$, mutually identical, represent a halogen atom;
Y is tetrahydrofuran (THF); and
n is 0 or 1.

3. A catalytic system for (co)polymerising conjugated dienes comprising:
(a) at least one oxo-nitrogenated vanadium complex having the general formula (I) of claim 1; and
(b) at least one co-catalyst that is an organo-derivative of aluminium selected from the group consisting of:
($b_1$) an aluminum compound having general formula (II):

$$Al(R_9)(R_{10})(R_{11}) \quad (II)$$

in which $R_9$ represents a hydrogen atom, or a fluorine atom, or is selected from a linear or branched $C_1$-$C_{20}$ alkyl group, a cycloalkyl group, an aryl group, an alkylaryl group, an arylalkyl group, or an alkoxy group; $R_{10}$ and $R_{11}$, mutually identical or different, are selected from a linear or branched $C_1$-$C_{20}$ alkyl group, a cycloalkyl group, an aryl group, an alkylaryl group, or an arylalkyl group,
($b_2$) an aluminoxane having general formula (III):

$$(R_{12})_2-Al-O-[-Al(R_{13})-O-]_m Al-(R_{14})_2 \quad (III)$$

in which $R_{12}$, $R_{13}$ and $R_{14}$, mutually identical or different, represent a hydrogen atom, or a halogen atom; or are selected from a linear or branched $C_1$-$C_{20}$ alkyl group, a cycloalkyl group, and an aryl group, said groups being optionally substituted with one or more atoms of silicon or germanium; and m is an integer ranging from 0 to 1000;

(b₃) a partially hydrolysed organo-aluminum derivative;

(b₄) a halogen alkylaluminum having general formula (IV) or (V):

$$Al(R_{15})_p(X_3)_{3-p} \qquad (IV)$$

$$Al_2(R_{15})_q(X_3)_{6-q} \qquad (V)$$

in which p is 1 or 2; q is an integer ranging from 1 to 5; $R_{15}$, mutually identical or different, is selected from a linear or branched $C_1$-$C_{20}$ alkyl group; and $X_3$ represents an atom of chlorine or bromine;

or mixtures thereof.

4. A catalytic system for (co)polymerising conjugated dienes according to claim 3, in which said co-catalyst is selected from an aluminoxane (b₂) having the general formula (III).

5. A process for (co)polymerising conjugated dienes, comprising providing conjugated dienes and (co)polymerizing said conjugated dienes including contacting said conjugated dienes with the catalytic system according to claim 3.

6. A process for polymerising 1,3-butadiene or isoprene, comprising providing 1,3-butadiene or isoprene and polymerizing said 1,3-butadiene or isoprene including contacting said 1,3-butadiene or isoprene with the catalytic system according to claim 3.

* * * * *